US011062700B1

(12) United States Patent
Azimi et al.

(10) Patent No.: US 11,062,700 B1
(45) Date of Patent: Jul. 13, 2021

(54) QUERY ANSWERING WITH CONTROLLED ACCESS KNOWLEDGE GRAPH

(71) Applicant: Amazon Technologies, Inc., Seattle, WA (US)

(72) Inventors: Pooria Azimi, Santa Barbara, CA (US); Zachary Philip Pearson Feinn, Goleta, CA (US); Thomas Reno, Santa Barbara, CA (US); Ivgeni Segal, Santa Barbara, CA (US); John Zucchi, Santa Barbara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 236 days.

(21) Appl. No.: 16/218,836

(22) Filed: Dec. 13, 2018

(51) Int. Cl.
| | | |
|---|---|---|
| *G10L 15/26* | (2006.01) | |
| *H04W 12/08* | (2021.01) | |
| *H04M 3/436* | (2006.01) | |
| *H04M 1/2757* | (2020.01) | |
| *H04M 3/487* | (2006.01) | |
| *G10L 15/18* | (2013.01) | |
| *G06F 16/332* | (2019.01) | |
| *G10L 25/54* | (2013.01) | |
| *G06N 5/02* | (2006.01) | |
| *G10L 13/00* | (2006.01) | |
| *G06F 16/28* | (2019.01) | |

(52) U.S. Cl.
CPC ............ *G10L 15/18* (2013.01); *G06F 16/288* (2019.01); *G06F 16/3329* (2019.01); *G06N 5/02* (2013.01); *G10L 13/00* (2013.01); *G10L 25/54* (2013.01)

(58) Field of Classification Search
CPC ... H04W 12/08; H04M 3/436; H04M 1/2757; H04M 3/4878; G10L 15/26
USPC ........................................................ 704/251
See application file for complete search history.

(56) References Cited

U.S. PATENT DOCUMENTS

| | | | | |
|---|---|---|---|---|
| 2004/0190688 | A1* | 9/2004 | Timmins ............. | H04M 3/4878 379/88.02 |
| 2005/0143999 | A1* | 6/2005 | Ichimura ................. | G10L 15/26 704/251 |
| 2005/0232400 | A1* | 10/2005 | Visser ................... | H04M 3/436 379/88.19 |
| 2006/0166646 | A1* | 7/2006 | Roach, Jr. ............. | H04W 12/08 455/411 |
| 2009/0110177 | A1* | 4/2009 | Sivakumar .......... | H04M 1/2757 379/218.01 |

\* cited by examiner

*Primary Examiner* — Farzad Kazeminezhad
(74) *Attorney, Agent, or Firm* — EIP US LLP

(57) ABSTRACT

A method comprising receiving first data representative of a query received by an electronic device. Device characteristic data indicative of at least one characteristic of the electronic device is received. It is determined, using the device characteristic data, that the electronic device is authorized to access a first portion of at least one knowledge graph, which is an access-controlled portion. The at least one knowledge graph also includes a second portion which is a non-access-controlled portion. The first data is sent to at least the first portion of the at least one knowledge graph. Second data is received from the first portion of the at least one knowledge graph. The second data is representative of an answer to the query. Answer data representative of the answer to the query is generated using the second data.

20 Claims, 10 Drawing Sheets

QUERY ANSWERING WITH CONTROLLED ACCESS KNOWLEDGE GRAPH

BACKGROUND

Computer-based query answering systems can provide answers to queries, which may be submitted by users in the form of text or speech. However, the effectiveness of such systems for answering queries may be improved, for example to provide more appropriate answers.

DETAILED DESCRIPTION

Figure 1:
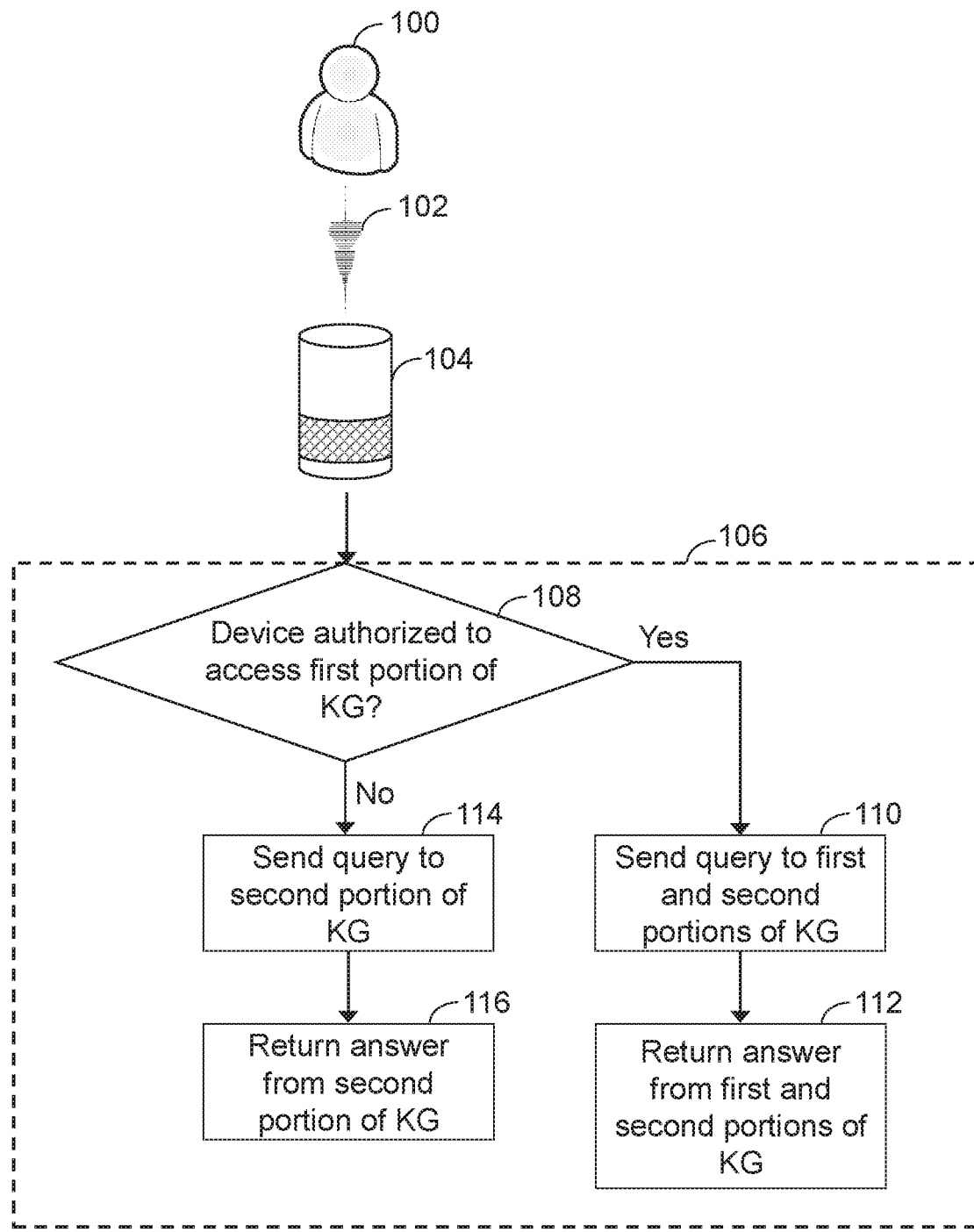
FIG. 1 illustrates schematically a method for obtaining an answer to a query according to examples.

Natural language processing (NLP) is a field of computer science, artificial intelligence, and linguistics concerned with the interactions between computers and human languages. Natural language processing can include natural language understanding (NLU), which deals with machine comprehension of words, either spoken or as text, enabling computers to derive meaning from natural language. In some instances, automatic speech recognition (ASR) can be used to generate text data from audio data and used with NLU to provide NLP.

A user may submit a query to a system arranged to perform NLP. In examples herein, a natural language understanding (NLU) system may be used to understand from text data (e.g., typed by a user, generated using ASR, etc.) that a query is being asked, and what the query is.

How appropriately an answer addresses a given query may depend on the data used by a computer-based system to generate the answer. For example, data that covers a broad range of topics may be used to successfully answer an equally broad range of general questions. In examples herein, such data is supplemented by additional data that may be more specific or that may include information that is not publicly available. Examples herein involve at least one knowledge graph that includes a first portion, which is an access-controlled portion. For example, the first portion of the at least one knowledge graph may be used to store a first dataset that is accessible to a first group of users, which may be a limited or restricted group of users. The first dataset may therefore be or include restricted content that is of limited or restricted accessibility. The at least one knowledge graph in these examples also includes a second portion, which is a non-access-controlled portion. The second portion of the at least one knowledge graph may be used to store a second dataset that is more widely accessible than the first dataset. For example, the second knowledge graph may be accessible to a second group of users including the first group of users, so that the first portion of the at least one knowledge graph is accessible to a subset of users with access to the second dataset. The second portion of the at least one knowledge graph may be freely or generally accessible. In this way, the second portion of the at least one knowledge graph may be unrestricted and may store unrestricted content. The first dataset may be more specific than the second dataset. For example, the first dataset may include data related to a particular organization, which may not be publicly available. Alternatively or additionally, the first dataset may include niche or more specialized information that may not be of wider interest, is confidential, is personal, and/or otherwise restricted from general access, but may nevertheless be of relevance to a first group of users with access to the first portion of the at least one knowledge graph.

In examples herein, access to the first portion of the at least one knowledge graph may be determined based on whether a device used to capture the query is authorized to access the first portion of the at least one knowledge graph. Such a determination is made based on device characteristic data indicative of at least one characteristic of the device, such as an identity of the device, a user profile associated with the device, a configuration of the device (e.g. settings of the device), or an application operative on or associated with the device.

If the device is authorized to access the first portion of the at least one knowledge graph, the query is routed to the first portion of the at least one knowledge graph. In some cases, the query is also routed to the second portion of the at least one knowledge graph, for example before a response is received from the first portion of the at least one knowledge graph. In examples, an answer obtained from the first portion of the at least one knowledge graph is returned to a user. The answer obtained from the first portion of the at least one knowledge graph may be returned regardless of a response from the second portion of the at least one knowledge graph. Hence, the answer from the first portion of the at least one knowledge graph may be considered to outrank other answers, such as an answer received from the second portion of the at least one knowledge graph, without specifically determining the relevance of each of the answers received. The answer from the first portion of the at least one knowledge graph may more appropriately or more specifically answer the query, as the first dataset of the first portion of the at least one knowledge graph may be more relevant to the user of the device than the second dataset of the second portion of the at least one knowledge graph. That the first dataset of the first portion of the at least one knowledge graph is of particular relevance to a user may be indicated by the characteristics of the device used by the user, such as at least one of a device profile, user profile, settings, or an application installed on or otherwise operative on the device. Hence, a more appropriate answer may be returned to the user in an efficient manner.

It is to be appreciated that methods herein may only be implemented with informed consent of a provider of data to be stored in the first portion of the at least one knowledge graph. The provider of the data stored in the first portion of the at least one knowledge graph maintains complete control of their data, and can control which other users and/or devices also have access to their data. Further, it is to be appreciated that any personal or otherwise restricted portions of the at least one knowledge graph and any system implementing the methods herein would be fully compliant with all relevant laws and regulations.

As an example, if a user asks the query: "Where does Employee 1 work?", the most appropriate answer to that query may depend on the context in which the query is asked (such as who is asking the query). For example, if the user works for the same organization as Employee 1, the user may be asking for a room location or office building in which Employee 1 works. In contrast, if the user works for a different organization, the user may wish to know which organization Employee 1 works for.

In accordance with methods herein, a device associated with the user may be authorized to access company information, such as a company directory. Such company information may be stored in a first portion of at least one knowledge graph. Hence, the query may be routed to the first portion of the at least one knowledge graph upon determining that the device used to capture the query is appropriately authorized to access the first portion of the at least one knowledge graph. The answer obtained may therefore include company information, such as a specific room location, which may not be accessible outside the company. In such cases, the query may also be routed to the second portion of the at least one knowledge graph, which may not be access-controlled, and may be freely or otherwise generally accessible. In this way, an answer received from the second portion of the at least one knowledge graph may act as a backup, which may be returned to the user if the first portion of the at least one knowledge graph lacks an answer.

In contrast, if a different user asks the same query using a device which is not authorized to access the first portion of the at least one knowledge graph, the query may be routed to the second portion of the at least one knowledge graph without being sent to the first portion of the at least one knowledge graph. The second portion of the at least one knowledge graph for example includes public information, such as the company for which Employee 1 works. Hence, the different user may obtain a more general answer to the query, such as the company for which Employee 1 works. Nevertheless, the more general answer may be more appropriate for the different user, who may work for a different company than Employee 1 and may therefore be seeking a less specific answer.

As a further example, the first portion of the at least one knowledge graph may include data related to a particular hotel, such as inventory available for purchase at the hotel, facilities available at the hotel or services offered by the hotel. In this example, a device provided by the hotel, e.g. in rooms of the hotel, may be authorized to access the hotel-specific data stored in the first portion of the at least one knowledge graph. Hence, if a user of the device in a hotel room asks the device for a toothbrush, this query may be sent to the first portion of the at least one knowledge graph. An answer may be returned indicating that the front desk will send a toothbrush to that user's hotel room. Conversely, if a user of a different device, located outside the hotel and without access to the first portion of the at least one knowledge graph, asks the same query, the answer returned may indicate that a toothbrush is available for purchase at an online store. Hence, different answers may be received in response to the same query, depending on the characteristics of the device used to answer the query.

It is to be appreciated that the same device may have different device characteristics at different points in time. Hence, the first portion of the at least one knowledge graph may be accessible (or not accessible) depending on the device characteristics at the time the query is asked. The device characteristics may be in the form of metadata associated with the query or context data representing a context in which the query is asked. For example, in the hotel example, the device characteristics may include an access point used to connect to a query-answering system, which may depend on a network available to the device. In a hotel room, the device may be connected to the hotel WiFi network via a WiFi access point. If it is detected that this access point is being used, answers received from the first portion of the at least one knowledge graph (which for example includes access-controlled data, that in this case is specific to the hotel), will be prioritized over less specific answers received from the second portion of the at least one knowledge graph. Conversely, if it is detected that the device is connected to a home WiFi network, at a user's home, answers received from the second portion of the at least one knowledge graph may be prioritized. Indeed, in such cases, the query may not be sent to the first portion of the at least one knowledge graph as it may be assumed that the first portion of the at least one knowledge is less likely to return an appropriate answer to a user at home.

Methods according to examples herein therefore facilitate the appropriate retrieval of answers to a query and for example improve an interaction between a user and a computer-based query answering system.

FIG. 1 illustrates schematically a method for obtaining an answer to a query according to examples. It is to be appreciated that certain features of the method of FIG. 1 are omitted or otherwise simplified for ease of understanding. A user 100 utters a query 102. The query 102 is received by an audio capture device 104, which transmits the query 102 for processing by a query-answering system 106, in order to attempt to obtain an answer to the query 102. The query 102 may be transmitted to the query-answering system 106 over a network. The audio capture device 104 may therefore be considered to capture a spoken utterance including a query 102. Features of the audio capture device 104 and a system for use with the audio capture device 104 of FIG. 1 are described in detail below with reference to FIGS. 2 and 5.

The query 102 may be processed by a natural language understanding (NLU) system before being transmitted to the query-answering system 106. An example of an NLU system is discussed in connection with FIG. 2. NLU typically allows a structured representation of an input (such as a query) to be generated, which may be referred to as an understanding. Such a representation can be consumed by the query-answering system 106 to generate an answer. However, in other examples, the input may be consumed by the query-answering system 106 without first being processed by an NLU system. An understanding may or may not have internal structure. An understanding may for example represent the meaning of a query as a query over a knowledge base, which may be a knowledge graph. An NLU subsystem may return confidence data or other metadata indicative of a process used to understand the query (although this is not necessary).

In the example of FIG. 1, first audio data represents the spoken utterance captured by the audio capture device 104. Natural language understanding (NLU) data is generated by processing the first audio data. Generating the NLU data may involve generating text data by processing the first audio data using automatic speech recognition (ASR) and subsequently processing the text data using NLU. The NLU data is transmitted to the query-answering system 106. It is to be appreciated, though, that in other examples the first audio data and/or the text data itself may be transmitted to the query-answering system 106 without first performing NLU processing. The query-answering system 106 may include a plurality of query-answering subsystems, which may each use a different approach in an attempt to obtain an answer to a query.

The query-answering system 106 determines, at item 108, whether the audio capture device 104 is authorized to access a first portion of at least one knowledge graph (KG). As discussed further with reference to FIG. 2, this for example includes receiving device characteristic data indicative of at least one characteristic of the audio capture device 104. The device characteristic data may include device identification data indicative of an identity of the audio capture device 104. It may subsequently be determined, using the device identification data, that the audio capture device 104 is associated with a user profile associated with access to the first portion of the at least one KG. In such cases, fewer user profiles may be associated with access to the first portion of the at least one KG than a second portion of the at least one KG. In this way, the first portion of the at least one KG may be an access-controlled portion of the at least one KG and the second portion of the at least one KG may be a non-access-controlled portion of the at least one KG. For example, the first portion of the at least one KG may be more less widely access, such as to fewer users and/or fewer devices, than the second portion of the at least one KG.

A KG may be considered to be a type of knowledge base (sometimes referred to as a knowledge database). In examples, a KG is in the form of a graph, with a node of the graph corresponding with an entity (which may be identified in a query using NLU) and an edge of the graph corresponding with a relation (which may also be identified using NLU). The entities and relations of a KG may be stored in any suitable format. For example, a KG may include a series of relational databases, which each include various entities and attributes of the entities. Entities and attributes may be connected or otherwise linked to each other via relationships (corresponding to edges of the graph), which are semantically meaningful. An example structure of a KG is discussed further with reference to FIGS. 6 and 7.

In FIG. 1, the first portion of the at least one KG is accessible to a first group of users and may therefore store a first dataset of relevance to the first group of users. Each of the users of the first group has a corresponding user profile. Hence, user profiles associated with users of the first group of users in this example are also associated with access to the first portion of the at least one KG. For example, the first portion of the at least one KG may be a private portion of a KG that is accessible solely to those users that are authorized to access the first dataset, and that are able to prove that they are authorized. For example, the first portion of the at least one KG may store enterprise data related to a particular enterprise or other organization, which may be confidential, personal and/or otherwise restricted from general access. In such cases, the organization may wish to grant access to their data solely to employees or to a subset of trusted employees. However, this is merely an example. In other cases, the first portion of the at least one KG may include public data that may be shared without privacy or other confidentiality concerns. However, the first dataset of the first portion of the at least one KG may nevertheless be accessible to a limited group of users (in this case, the first group of users) as the first dataset may be of limited interest to other people. For example, the first dataset may relate to statistics, such as player information, for a local sports team that is relevant to supporters of that sports team, but of limited interest or relevance to other people. The first group of users may change over time. For example, as the sports team grows in popularity, the number of supporters may increase, and the first dataset may be relevant to a larger number of people. Users interested in accessing this data may signal their interest by appropriately configuring the characteristics of their device, such as installing a user profile associated with the device, installing an appropriate application and/or installing appropriate settings for the device.

If it is determined at item 108 that the audio capture device 104 is authorized to access the first portion of the at least one KG, the NLU data is sent to the first portion of the at least one KG at item 110 of FIG. 1. Item 110 of FIG. 1 also includes sending the NLU data to a second portion of the at least one KG. The second portion of the at least one KG in this example is accessible to a second group of users including the first group of users. The second group of users is larger than the first group of users. In other words, the first group is a subset of the second group of users. The second portion of the at least one KG in the example of FIG. 1 includes a second dataset of relevance at least to the second group of users. For example, the second dataset may of wider relevance than the first dataset. The second dataset may thus be more general or otherwise less specific. The second portion of the at least one KG may be a public portion of a KG that is freely accessible without requiring specific authorization prior to access. For example, the second portion of the at least one KG may be freely accessible to users. In this way, the second portion of the at least one KG may be considered to be a non-access-controlled portion of the at least one KG. In other examples, though, the second portion of the at least one KG may also be a private KG or another KG with limited or restricted access. However, the second portion of the at least one KG may nevertheless be more widely accessible than the first portion of the at least one KG. In such cases, the second portion of the at least one KG may nevertheless be considered to be a non-access-controlled portion (compared to the first portion, which is an access-controlled portion), in that the access to the first portion of the at least one KG may impose additional authorization requirements than for accessing the second portion of the at least one KG. Hence, non-access-controlled may be used herein as a relative term, relative to access-controlled (which for example involves additional access control compared to non-access-controlled components).

In examples in accordance with FIG. 1, text data representative of a first answer to the query may be received from the first portion of the at least one KG and text data representative of a second answer to the query may be received from the second portion of the at least one KG. Despite receiving answers from both the first and second portions of the at least one KG, the method of FIG. 1 involves returning the first answer from the first portion of the at least one KG at item 112. For example, second audio data may be generated using text to speech (TTS) processing and the text data representative of the first answer to the query, so as to generate second audio data which is representative of the first answer to the query. In this example, the first answer is returned regardless of the second answer. For example, the first answer may be returned on the basis that it has been received from the first portion of the at least one KG rather than from the second portion of the at least one KG. This works on the assumption that the first answer is more likely to appropriately address the query than the second answer, as the first dataset of the first portion of the at least one KG is for example more specific than the second dataset of the second portion of the at least one KG. The first answer may be returned without first checking whether the first answer is indeed more relevant to the query than the second answer. This allows the first answer to be returned rapidly and efficiently. Moreover, the query may be more appropriately answered by returning the first answer than by returning a more general answer, such as the second answer which is obtainable using the second portion of the at least one KG. FIG. 1 is merely an example, though, and in some cases sending of the query to the second portion of the at least one KG may be omitted or the answer from the first portion of the at least one KG may be returned without receiving an answer from the second portion of the at least one KG.

Referring back to FIG. 1, if the audio capture device 104 is determined to lack authorization to access the first portion of the at least one KG at item 108, the method of FIG. 1 includes sending the query to the second portion of the at least one KG at item 114. For example, the NLU data may be sent to the second portion of the at least one KG at item 114, in order to send the query to the second portion of the at least one KG. The second answer may then be returned to the user from the second portion of the at least one KG at item 116, which may also be converted to audio data using TTS processing before being sent to the user.

For example, in accordance with FIG. 1, third audio data representative of a second spoken utterance captured by a second audio capture device may be received, where the second spoken utterance includes a second query. Second NLU data may be generated by processing the third audio data, for example using NLU. Second device characteristic data indicative of at least one characteristic of the second audio capture device may be received. It may then be determined to omit sending of the second NLU data to the first portion of the at least one KG by determining, using the second device characteristic data, that the second audio capture device lacks authorization to access the first portion of the at least one KG. In examples, the second device characteristic data includes second device identification data indicative of an identity of the second audio capture device. In such examples, determining to omit second of the second NLU data to the first portion of the at least one KG may involve determining, using the second device identification data, that a second user profile associated with the second audio capture device is not associated with access to the first portion of the at least one KG. This determination may be performed at item 108 of FIG. 1, for example. In other words, the second NLU data may not be sent to the first portion of the at least one KG and may instead be sent to the second portion of the at least one KG. Second text data representative of an answer to the second query may then be received from the second KG, and third audio data may be generated using TTS and the second text data. The third audio data in this example may therefore be representative of the answer to the second query.

Figure 2:
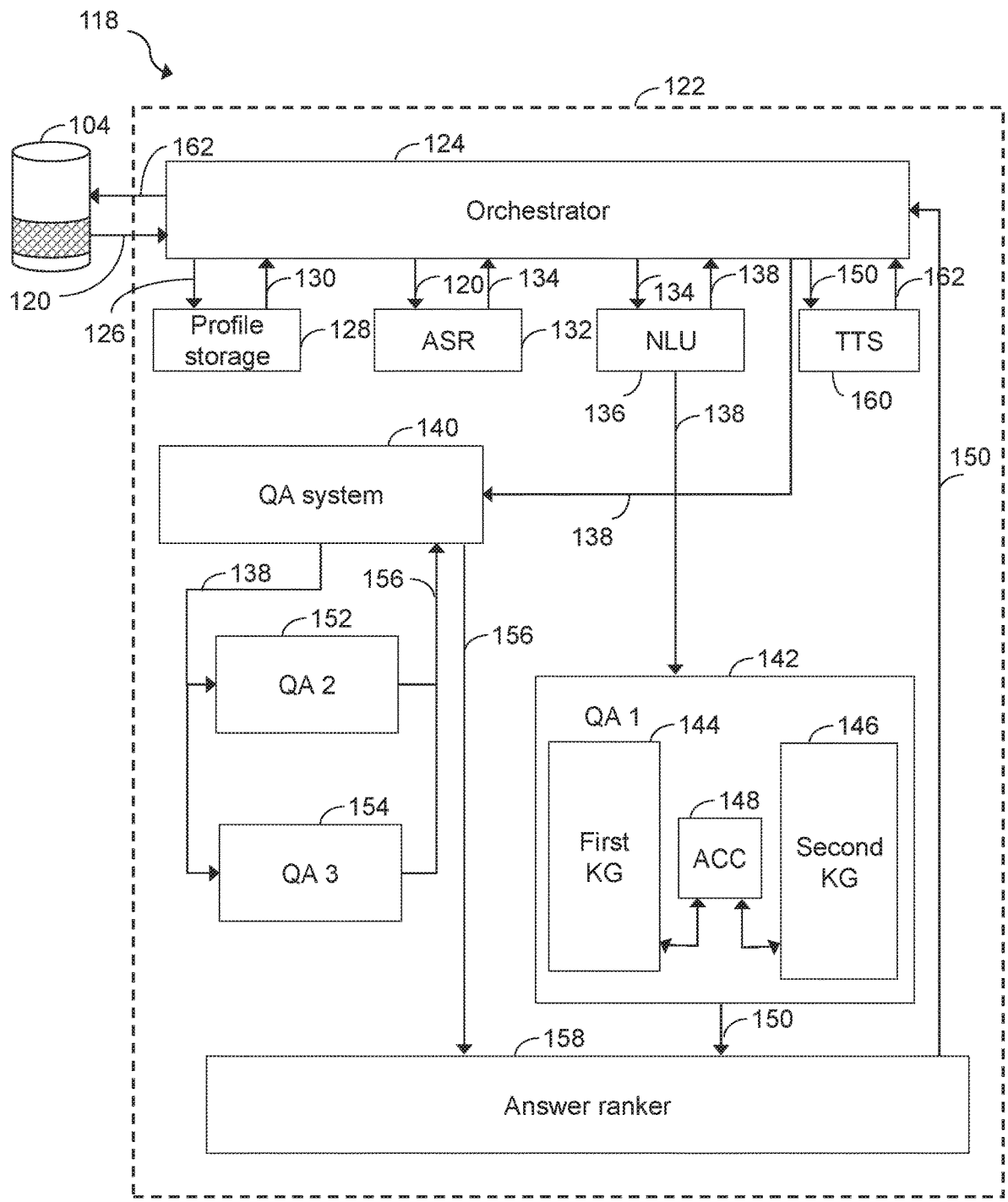
FIG. 2 illustrates schematically an example of a system for use with methods described herein.

FIG. 2 illustrates schematically an example of a system 118 for use with methods described herein, such as methods in accordance with FIG. 1. Features of FIG. 2 which are similar to corresponding features of FIG. 1 are labelled with the same reference numerals. Corresponding descriptions are to be taken to apply.

The audio capture device 104 receives first audio data representative of a spoken utterance which includes a query. The audio capture device 104 for example includes a microphone or a microphone array. The audio capture device 104 may be or form part of a speech-controlled device, which may be instructed to perform various actions using a spoken input. The audio capture device 104 may also include at least one speaker, for example for providing audio output for responding to a user in response to the user's utterance, for example based on NLU of the user's utterance, to provide an appropriate response to the user's utterance, such as an answer to a question asked by the user. The audio capture device 104 may be part of a computer device, such as a device with computational capability such as a laptop or personal computer; a mobile or a cellular phone. For example, the audio capture device 104 may be or form part of various different electronic devices such as a mobile phone (sometimes referred to as a cellular phone or cell phone), a far field device such as the Amazon Echo, a tablet, an automobile, a robot, or a wearable device such as a smart watch.

The audio capture device 104 may process the first audio data to determine whether the audio represented by the first audio data includes speech. Various techniques may be used. For example, the audio capture device 104 may apply voice activity detection (VAD) techniques. Such techniques may determine whether speech is present in the first audio data based on various quantitative aspects of the first audio data, such as the spectral slope between one or more frames of the first audio data; the energy levels of the first audio data in one or more spectral bands; the signal-to-noise ratios of the first audio data in one or more spectral bands; or other quantitative aspects. In other examples, the audio capture device 104 may implement a limited classifier configured to distinguish speech from background noise. The classifier may be implemented by techniques such as linear classifiers, support vector machines, and decision trees. In still other examples, the audio capture device 104 may apply Hidden Markov Model (HMM) or Gaussian Mixture Model (GMM) techniques to compare the first audio data to one or more acoustic models in storage, which acoustic models may include models corresponding to speech, noise (e.g., environmental noise or background noise), or silence.

Once speech is detected in the first audio data, the audio capture device 104 may use a wakeword detection component to perform wakeword detection to determine when a user intends to provide a spoken input to the audio capture device 104. For example, a wakeword may be a command to activate the audio capture device 104 from a standby mode. This process may also be referred to as keyword detection, using a keyword detection component, with a wakeword being a specific example of a keyword. An example wakeword is "Alexa."

Wakeword detection is typically performed without performing linguistic analysis, textual analysis, or semantic analysis. Instead, the first audio data may be analyzed to determine if specific characteristics of the audio data match preconfigured acoustic waveforms, audio signatures, or other data to determine if the first audio data matches or corresponds to stored audio data corresponding to a wakeword. In other examples, though, the user may activate the audio capture device 104 from the standby mode via other input than a wakeword, for example by pressing a button of the audio capture device 104.

Once the audio capture device 104 is active (for example upon detection of the wakeword), the audio capture device 104 may begin transmitting the first audio data 120 to a server system 122. The server system 122 may be a single server or a distributed system including a plurality of servers which are able to communicate with each, for example via a network. The first audio data 120 may include data corresponding to the wakeword, or the portion of the first audio 120 corresponding to the wakeword may be removed by the audio capture device 104 prior to sending the first audio data 120 to the server system 122.

Upon receipt by the server system 122, the first audio data 120 in the example of FIG. 2 is sent to an orchestrator component 124. The orchestrator component 124 may include memory and logic that enables the orchestrator component 124 to transmit data to various components of the system 118, as well as perform other operations as described herein. In this way, the orchestrator component 124 orchestrates or coordinates the sending of data and/or commands to other components, such as other components of the system 118.

In the example of FIG. 2, the first audio data 120 includes additional non-audio data, such as metadata. The non-audio data for example represents other information related to the utterance represented by the first audio data 120. The non-audio data may for example include device characteristic data indicative of at least one characteristic of the audio capture device 104.

For example, the non-audio data may include device identification (ID) data representative of an identity of the audio capture device 104. The device ID data may represent a device serial number, device ID number, device ID code or any other suitable identifier that allows the identity of the audio capture device 104 to be determined. For example, the device ID may represent a media access control (MAC) address of the audio capture device 104.

The non-audio data may also or additionally include user identification (ID) data representative of an identity of a user of the audio capture device 104. The user ID data may for example represent a user ID number or code. The user ID number may be obtained and stored in the audio capture device 104 when the user logs in, begins to use or otherwise accesses the audio capture device 104. For example, the user may enter a username and password upon interacting with the audio capture device 104 or upon setting the audio capture device 104 for use. The username may be associated with a unique user, who may in turn be associated with a user ID number. The user ID data may be stored on the audio capture device 104 and sent as metadata along with audio received.

In other examples, the user ID may represent a voice ID number or voice ID code, from which a user may be identified. The voice ID number may be determined based on analysis of the utterance received, to identify that the voice present in the utterance belongs to a particular user. For example, a plurality of different users may use the audio capture device 104. Each of these users may however a different-sounding voice. Differences in each of these users' voices, as captured as audio data using the audio capture device 104, may be used to determine which of the users is interacting with the audio capture device 104 at a given moment. The appropriate user ID may then be included in the first audio data 120 as metadata. Various different methods may be used to identify a user's voice. For example, a user's voice may be recorded using the audio capture device 104 in which may be referred to as an enrollment phase. The recording of the user's voice may be processed to determine various features of the user's voice (specific to that particular user), to generate a voice print for that user. Upon receipt of an utterance using the audio capture device 104, the utterance may be compared with the voice prints of each of the users enrolled on the audio capture device 104. If the utterance matches one of the voice prints, the utterance may be associated with a user ID for the user associated with that particular voice print. This is not intended to be limiting though, and other methods, such as other voice recognition methods, may be used to determine that the first audio data 120 represents an utterance uttered by a particular user.

Figure 3:
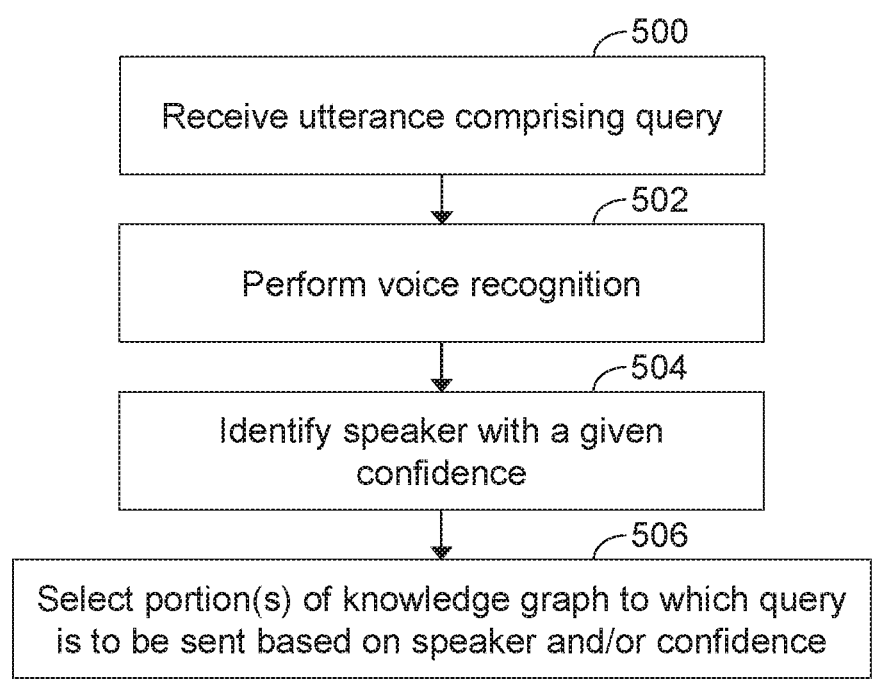
FIG. 3 is a flow diagram illustrating a method for obtaining an answer to a query according to further examples.

FIG. 3 is a flow diagram illustrating an example in which voice recognition is used. At item 500 of FIG. 3, a spoken utterance comprising a query is received, for example by an audio capture device such as the audio capture device 104 of FIG. 2. The utterance is for example captured as first audio data representative of the spoken utterance. At item 502 of FIG. 3, the first audio data is processed using voice recognition to identify a user profile associated with the audio capture device 104. The voice recognition processing may be performed by the server system 122, by the audio capture device 104 itself and/or by an other component(s). Confidence data representative of a confidence with which the user profile associated with the audio capture device is identified is generated. For example, the confidence data represents how confident the system is that the user profile has been correctly identified. The confidence data may be generated during the voice recognition process. For example, the voice recognition process may output the most likely user profile, as well as a confidence that the most likely user profile is correct. Alternatively, the confidence data may be generated subsequently, for example by determining a difference between the utterance and the voice prints for the user profiles associated with the audio capture device. In such cases, the greater the difference, the lower the confidence that the user profile has been correctly identified. The confidence data therefore allows the speaker of the utterance to be identified with a given confidence, at item 504. Hence, the identified speaker may not be the actual speaker (e.g. if the voice recognition process incorrectly identifies the speaker. However, the confidence data may provide a measure by which the identification can be assessed. For example, if the confidence represented by the confidence data is high, the identity of the speaker as determined by the voice recognition process may be more trusted than otherwise.

Based on the confidence data, portion(s) of at least one KG to which the query is to be sent may be determined, at item 506 of FIG. 3. This may include determining to send the query to the first portion of the at least one KG, for example as first audio data, as NLU data or in an other data format. For example, where the first portion of the at least one KG includes data derived from an email and/or calendar of various people (such as employees of an organization), the method may include determining, with a particular level of confidence, that the speaker is an employee of the organization, before allowing the speaker to access such data. As another example, where the first portion of the at least one KG includes bank account information, the level of confidence that the speaker has been correctly identified may be high before access to the bank account information (e.g. as stored in the first portion of the at least one KG) is granted.

Referring back to FIG. 2, in further examples, the non-audio data may include organization identification (ID) data indicative of an organization to which the audio capture device 104 belongs. The organization ID data may represent an organization ID number or code. Such an organization ID number or code may be associated with the audio capture device 104 if the audio capture device 104 is appropriately linked to an appropriate organization. For example, an organization may provide a plurality of audio capture devices 104, for example to be used within a location associated with the organization. The organization may register or otherwise enroll each of these audio capture devices 104 as organization-specific devices, for example using a management portal or other management tool.

The non-audio data may include context data indicative of a context in which the query is received. A context may relate to an environment and/or location in which the query is asked. For example, the context data may be indicative of a network and/or a network access point used by the audio capture device 104. A network may for example be used to send data relating to the query between the audio capture device 104 and the server system 122. The context data may additionally or alternatively include location data, for example based on global positioning system (GPS) data, indicating a location of the audio capture device 104 when the query is received. From such data, it may be determined whether the audio capture device 104 is in a particular environment, such as a workplace, home, organization or other location. Based on this, it may be determined whether the audio capture device 104 is authorized to access the first portion of the at least one KG. For example, the first portion of the at least one KG may have limited accessibility to users and/or devices within a particular predetermined range of a given location (such as within a hotel, where the first portion of the at least one KG includes hotel data related to the hotel).

The non-audio data may include device configuration data indicative of at least one configuration aspect of the audio capture device 104. A configuration aspect is for example a particular way in which the audio capture device 104 has been configured or otherwise set up for use. For example, a configuration aspect may refer to at least one setting associated with the audio capture device 104. Access to the first portion of the at least one KG may depend on the audio capture device 104 being configured in a particular way, for example with particular settings, which may be determined by the device configuration data. For example, the first portion of the at least one KG may be accessible solely to devices with particular security settings, to improve the security of the data stored in the first portion of the at least one KG.

In yet further examples, the non-audio data may include authentication data indicative that the user and/or the audio capture device 104 has successfully completed at least one further form of authentication, such as entering a password and/or entering a code sent to a known phone, user device and/or application associated with the user and/or audio capture device 104. This may be used to further determine that the device (and/or the user of the device) is authorized to access the first portion of the at least one KG.

It is to be appreciated that the non-audio data may include any combination of the non-audio data these examples. In some cases, the device characteristic data may include audio data in addition to the non-audio data. The device characteristic data may nevertheless be at least partly received from the audio capture device 104 (although it may instead be partly or fully received from a different source, such as a further data store). For example, the device characteristic data may include background audio data, representative of background noise indicative of an environment in which the query is being asked to the device. This may be used to determine a location associated with the query, which may be used to determine whether access to the first portion of the at least one KG is to be granted.

The device characteristic data may be cryptographically secured before it is sent to the server system 122. For example, a cryptographic hash function may be applied to the device characteristic data (or to elements of the device characteristic data) to prevent the device characteristic data being intercepted and recovered while in transit between the audio capture device 104. The output of a cryptographic hash function is deterministic, in that application of the hashing algorithm again to exactly the same input data will produce the same hash. However, a cryptographic hash function may be considered to be one-way in that the original input data (in this case, the non-audio data) cannot be recovered from the output of the cryptographic hash function alone, even with full knowledge of the hashing algorithm. In examples in which the device characteristic data includes a plurality of different elements (such as device ID data and user ID data) each of these elements may be secured separately. For example, a device ID and a user ID may each be hashed, using a cryptographic hash function, separately.

The orchestrator component 124 in FIG. 2 sends the device characteristic data 126 to profile storage 128 (sometimes referred to as a device metadata service), which may include a variety of information related to individual users, groups of users, devices, and so forth, that interact with the system 118. A profile typically refers to a set of data associated with an entity, such as a user or device. The data of a profile may include preferences specific to the entity, such as user or device preferences; input and output capabilities of the device; internet connectivity information; user bibliographic information; subscription information, as well as other information. The profile storage 128 may include one or more user profiles, with each user profile being associated with a different user ID. Similarly, the profile storage may also or alternatively include one or more device profiles, each associated with a different device ID. Each device profile may include various device identifying information. Each device profile may also include one or more user IDs, representing one or more users associated with the device. For example, a household device's profile may include the user identifiers of users of the household. For a given device and/or user, the profile storage 128 may include data indicative of whether the device and/or user is associated with a particular organization or group of users associated with an organization.

In the example of FIG. 2, the orchestrator component 124 is arranged to determine, using device identification data received as part of the non-audio data 126, using the data of the profile storage 128, whether the device and/or the user is authorized to perform certain functions. For example, access to certain query-answering systems (discussed further below) may be limited to a subset of users and/or devices. For example, the device identification data may represent a device ID. The device ID may be used to obtain a user profile from the profile storage 128. It may then be determined whether the user profile is associated with access to the first portion of the at least one KG, for example by comparing the user profile (or elements of the user profile, such as a user ID), with a list or other data store of user profiles associated access to the first portion of the at least one KG. The orchestrator component 124 receives authorization data 130 from the profile storage 128, which may be used subsequently to determine processing to be applied to the data received from the audio capture device 104.

The orchestrator component 124 then sends the first audio data 120 representing the utterance to an ASR system 132. The first audio data 120 may be in the form of a digitized representation of an audio waveform of the utterance. The ASR system 132 converts the first audio data 120 to text data 134. In addition to performing ASR, the ASR system 132 may also detect an endpoint of the utterance and send a message to the audio capture device 104 to close an audio data stream. This message may be sent via the orchestrator component 124.

The first audio data 120 may be processed in real time or may be saved and processed at a later time. The ASR system 132 may be configured to interpret the utterance represented by the first audio data 120 based on the similarity between the utterance and models known to or otherwise accessible to the ASR system 132. For example, the ASR system 132 may compare the first audio data 120 with models for sounds (e.g., subword units or phonemes) and sequences of sounds to identify words that match the sequence of sounds spoken in the utterance. The different ways an utterance may be interpreted may each be assigned a probability or another recognition score representing the likelihood that a particular set of words matches those spoken in the utterance. The recognition score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Based on the considered factors and the assigned recognition score, the ASR system 132 may output the most likely words recognized in the first audio data 120. The ASR system 132 may also output multiple alternative recognized words in the form of a lattice or an N-best list.

The ASR system 132 of FIG. 2 includes an echo cancellation filter, an acoustic front end (AFE), a speech recognition engine, and speech storage. The echo cancellation filter for example compares audio that is output by the user of the audio capture device 104 with sound picked up by the audio capture device 104, and removes the output sound from the captured sound in real time. Echo cancellation is commonly used by cellular telephones and other telephones operating as speaker phones, and facilitates the ASR process by removing a component of captured sounds that can interfere with speech recognition.

The AFE transforms the audio data after echo cancellation into data for processing by the speech recognition engine. The speech recognition engine compares the speech recognition data with the acoustic, language, and other data models and information stored in the speech storage for recognizing the speech contained in the original audio data. The AFE and speech recognition engine may include their own controller(s)/processor(s) and memory or they may use at least one processor and the at least one memory of the system 118 (which may be accessible to other components of the system 118), for example. Similarly, the instructions for operating the AFE and speech recognition engine may be located within the ASR system 132, within at least one memory and/or storage of the system 118, or within an external device.

The AFE within the ASR system 132 may divide the digitized first audio data into frames, with each frame representing a time interval, for example 10 milliseconds (ms). During that frame the AFE determines a set of values, a feature vector, representing the features/qualities of the utterance portion within the frame. Feature vectors may contain a varying number of values and represent different qualities of the audio data within the frame. Audio qualities of points within a frame may be stored into feature vectors. Feature vectors may be streamed or otherwise combined into a matrix that represents a time period of the spoken utterance.

These feature vector matrices may then be passed to the speech recognition engine for processing. A number of approaches may be used by the ASR system 132 and AFE to process the first audio data 120. Such approaches may include using mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine attempts to match received feature vectors to language phonemes and words such as may be known in storage or at least one memory accessible to the ASR system 132. The speech recognition engine may compute recognition scores for the feature vectors based on acoustic information and language information. The acoustic information may be used to calculate an acoustic score representing a likelihood that the intended sound represented by a group of feature vectors match a language phoneme. The language information may be used to adjust the acoustic score by considering what sounds and/or words are used in context with each other, thereby improving the likelihood that the ASR system 132 outputs speech results that make sense grammatically.

The output of the ASR system 132 in FIG. 2 is in the form of text data 134, representative of text. The text data 134 may be in any suitable format for representing text, such as a string, a vector or an array of vectors, such as an array of feature vectors. For example, each feature vector may be considered to correspond to a separate word of the utterance, such that the utterance may be represented as the array of feature vectors. Alternatively, the utterance may be represented using solely one vector, which may be formed by concatenating feature vectors representative of individual words of the query. It is to be appreciated that the format of the text data 134 may be modified as the text data 134 is transferred between different components of the system 118. For example, where the methods described herein are employed within a speech processing system such as that of FIG. 2, the text data may be in the form of a vector. In contrast, if the user submits a query in the form of text (rather than vocally), text data representative of the query may be in the form of a string.

Following ASR processing, the text data 134 generated by the ASR system 132 of FIG. 2 is sent by the ASR system 132, in this case via the orchestrator component 124, to an NLU system 136 of the system 118 for further processing. The orchestrator component 124 may also send the device characteristic data to the NLU system 136, such as device identification data and/or a user profile, which may be used by the NLU system 136 to aid understanding of the text data 134. The NLU system 136 may also receive textual input from another source, such as via an I/O component of the system 118. The NLU system 136 may include a dedicated NLU engine, processor, memory, storage, named entity recognition (NER) system and/or other components, and/or may use components otherwise available on or accessible to the system 118.

The NLU system 136 for example takes the text data 134 output from the ASR system 132 and attempts to make a semantic interpretation of the text data 134. That is, the NLU system 136 may determine the meaning behind the text represented by the text data 134, for example based on the individual words, and then may execute a command based on the meaning or pass a command to a downstream application for execution. The NLU processing is based on the models and programming available to the NLU system 136. Such models may be grammar based, rule based, or constructed in a different manner.

NER processing typically involves processing a sequence of words in a textual input, recognizing and identifying specific important words, called entities, of an NLU textual input and assigning a tag or other label to those words, which may be performed by a NER system of the NLU system 136. The tag is a classification of the associated word that may assist eventually implementing the user's utterance. Certain parts of speech (such as conjunctions that join phrases, clauses and sentences) may be considered less important, thus not considered an entity and may not receive a tag.

As part of determining what (if any) tag to apply to each word, the NER system may consider textual context information, such as what words come before or after the word being processed or what other words appear in the sentence. These factors to consider in processing, called features, are indicated to the NER system through feature vectors. Each word in the sequence of words is associated with a corresponding feature vector. The feature vector is a long data structure which indicates what circumstances apply to the particular word. For example, the NLU system 136 may have access to an index of thousands of words that are known to the system. The feature vector may include an entry for all or a subset of the words in the index to indicate whether the selected word of the index is the actual word being processed, whether a word in the index is located in the same sentence as the word being processed, or whether a word in the index is directly before or after the word being processed. The information in the feature vector may then influence the NER processing in its attempt to tag the text.

A feature vector may include components that are binary features that may be effectively "yes or no" indicators or may include non-binary values. Other information about the text may also be indicated to the NER system through entries in the feature vector. The individual feature vectors for specific words are typically sparse, meaning that only a small subset of the feature vector entries have a non-zero value. The information represented by the feature vector entries are typically defined when training the models used by the NER system. When performing NER, the NER system thus may process the feature vector associated with the word, rather than processing the word itself.

Generally, models used for NER may be trained with feature vectors such as those associated with words during NER processing, with the feature vectors capturing the word identity as well as other information that may be pertinent to that word (e.g. contextual and other information as mentioned above). Known models that may be used in NER include maximum entropy models (also known as log-linear models), such as Maximum Entropy Markov Models (MEMMs) and Conditional Random Fields (CRFs). The underlying model may apply weights to certain of the data/feature-components associated with the word and included in the feature vector. The weights may determine the relative importance of each of the feature vector components. Feature vector weights may be applied during training where the underlying NLU model essentially provides the set of weights that are trained on a certain set of data/words and those weights indicate how important each of those feature vector components are. Thus the NER model internally has weight vectors that have the same dimension as the actual feature vectors and when the NER system is predicting the labels, it may calculate an inner product (or dot product) of the feature vector and the weight vector so that each individual feature of the feature vector is properly weighted.

The processing of the text data 134 performed by the NLU system 136 therefore attempts to make a semantic understanding of the text data 134, for example to identify an intent of the text data 134. In this way, the NLU system 136 may be used to identify that the text data 134 represents a query. In this way, the NLU system 136 may therefore identify understandings of the query.

The NLU system 136 may be a federated understanding system. A federated system is for example any system which includes a plurality of different subsystems each providing an alternative approach to performing the same function or a similar function. Hence, a federated understanding system typically includes a plurality of different NLU subsystems, which each approach NLU in a different way. Example NLU subsystems are rule-based systems, knowledge base querying systems and information retrieval based systems, although other systems and/or methods may be used for NLU instead.

The NLU system 136 generates NLU data 138 (which may include tagged text data, indicators of intent, and so forth). The NLU system 136 sends the NLU data 138 to the orchestrator component 124. In this example, the NLU data 138 indicates that a query has been asked. The orchestrator component 124 then sends the NLU data 138 to a query-answering system 140, which in this example is a federated answering system. However, in other examples, a representation of the query may be sent to at least one query-answering system in parallel with sending the representation of the query to the NLU system 136 or before the NLU data 138 is received from the NLU system 136. In such cases, the representation of the query which is sent to the at least one query-answering system may be the text data 134 received by the ASR processing performed by the ASR system 132.

In FIG. 2, the NLU data 138 is sent to a first query-answering system 142 from the NLU system 136, without first being sent to the orchestrator component 124 (although this need not be the case in other examples). In this example, the first query-answering system 142 includes a first KG 144 and a second KG 146. The first KG 144 may be the same as the first portion of the at least one KG of FIG. 1, and the second KG 146 may be the same as the second portion of the at least one KG of FIG. 1. In other words, the first and second portions of the at least one KG may each be separate KGs, as is shown in FIG. 2. However, in other examples (such as that of FIG. 5), the first and second portions of the at least one KG may be different portions of the same KG.

In FIG. 2, there is an access control component 148 between the first KG 144 and the second KG 146. In examples such as FIG. 2, the access control component 148 may be operable to provide a one-way connection between the first KG 144 and the second KG 146 such that the first KG has at least read access to the second KG 146 without the second KG having read access to the first KG. Hence, the first KG 144 may be authorized to access the second KG 146 but the second KG 146 may be prevented from accessing the first KG 144. This therefore isolates the first dataset of the first KG 144 from the second KG 146, to reduce the risk of unauthorized access to the first dataset via the second KG 146.

The access control component 148 may be any suitable component, system or other element to provide a one-way connection in this way. For example, the first KG 144 may be stored on a different and/or separate server than the second KG 146. The first KG 144 may therefore be hosted within a first virtual private cloud (VPC) and the second KG 146 may be hosted with a second VPC, with a VPC peering connection between the two VPCs, which acts as the access control component 148. A VPC peering connection is for example a network connection between two VPCs, which may be configured to allow two-way or (in this case) one-way traffic between the VPCs.

As explained with reference to FIG. 1, the NLU data 138 is sent to both the first KG 144 and the second KG 146. Text data representative of a first answer to the query is received from the first KG 144 and text data representative of a second answer to the query is received from the second KG 146. The first query-answering system 142 returns the text data 150 representative of the first answer as the answer to the query. The text data 150 obtained from the first KG 144 is for example returned as the answer irrespective of the response received from the second KG 146. For example, the first KG 144 may be considered to override the second KG 146. A further discussion of the operation of the first query-answering system 142 is provided with reference to FIG. 4.

While the NLU data 138 is processed with the first query-answering system 142, the NLU data 138 is also processed using the federated query-answering system 140. The federated query-answering system 140 routes the NLU data 138 to a plurality of query-answering subsystems (in this case, a second query-answering subsystem 152 and a third query-answering subsystem 154, although this is merely an example). Each of the query-answering subsystems for example takes a different approach to query answering. For example, the second query-answering subsystem 152 may be a further KG, which includes different data than the first and second KGs 144, 146. In contrast, the third query-answering subsystem 154 may be an editorial answering system, which for example provides narrative answers to queries. It is to be appreciated that the orchestrator component 124 may also send the device characteristic data to one or more of the query-answering subsystems 152, 154 and/or to the first query-answering system 142, such as device identification data and/or a user profile. This data may be used by the query-answering subsystem(s) or system(s) to obtain an appropriate answer to the query, which may depend on user preferences (for example as captured in the user profile).

Answer data 156 representative of at least one answer to the query obtained by the query-answering subsystems 152, 154 is returned to the federated query-answering system 140. The answer data 156 may subsequently be sent to an answer ranking component 158. In FIG. 2, the answer data 156 is sent to the answer ranking component 158 via the query-answering system 140 (which for example acts to coordinate or otherwise control each of the query-answering subsystems 152, 154). However, in other examples, answer data may be sent directly to the answer ranking component 158 from the respective query-answering subsystem.

The answer ranking component 158 also receives the text data 150 from the first query-answering system 142. The answer ranking component 158 may then be used to rank between multiple answers, to determine the most appropriate answer to return to the user. For example, the answer ranking component 158 may rank the answers based on the query-answering system or other subsystem from which the answers were obtained. Alternatively or additionally, the answers may be ranked based on answer confidence data associated with an answer, which may be generated by the query-answering system or other subsystem which generated the answer, and which may indicate which the confidence that the query-answering system or other subsystem has in the answer. In other examples, though, the answer ranking component 158 may be omitted. In such cases, the answer obtained most rapidly may be returned to the user, for example.

In the example of FIG. 2, the answer ranking component 158 determines that the text data 150 obtained from the first KG 144 is to be returned to the user. The text data 150 is then sent to the orchestrator component 124. The orchestrator component 124 then sends the text data 150 to a text to speech (TTS) system 160 to generate second audio data 162 using text to speech processing and the text data 150. TTS is a field of computer science, artificial intelligence, and linguistics concerned with enabling computers to output synthesized speech. There are various different TTS methods. In one method of speech synthesis called unit selection, the TTS system 160 matches the text data 150 against a database of recorded speech. The TTS system 160 selects matching units of recorded speech and concatenates the units together to form the second audio data 162. In another method of speech synthesis called parametric synthesis, the TTS system 160 varies parameters such as frequency, volume, and noise to create the second audio data 162 including an artificial speech waveform. Parametric synthesis uses a computerized voice generator, sometimes called a vocoder.

After generation of the second audio data 162, the TTS system 160 sends the second audio data 162 to the orchestrator component 124, which then sends the second audio data 162 to the audio capture device 104. The audio capture device 104 can then play output audio based on the second audio data 162 to the user.

In examples in accordance with FIGS. 1 and 2 (and in FIG. 5, described below), the method of obtaining the answer from the first portion of the at least one KG in preference to, or without checking whether an answer is received from the second portion of the at least one KG or a relevance of the answer received from the second portion of the at least one KG, may be performed without specifically invoking an application associated with the first portion of the at least one KG. For example, the system 118 of FIG. 2 may route the NLU data 138 to the first query-answering system 142 without first determining that an application associated with access to the first KG 144 has been invoked or otherwise specifically opened. For example, a user may typically invoke an application using the audio capture device 104 by referring, in their utterance, to the name of the particular application to be invoked. However, in examples herein, the user need not specifically refer to and/or open the application associated with the first KG 144. The query may nevertheless be sent to the first KG 144 if it is detected that the audio capture device 104 includes the application associated with the first KG 144, as this may be considered to be a sufficient indication that the user wishes to access the first dataset of the first KG 144. The user may therefore interact more straightforwardly and more naturally with the system 118, for example without having to remember the name of the particular application associated with the first KG 144. In other cases, though, the query may be sent to the first KG 144 (or the first portion of the at least one KG) without checking whether the audio capture device 104 includes an application associated with the first KG 144 (or the first portion of the at least one KG).

Figure 4:
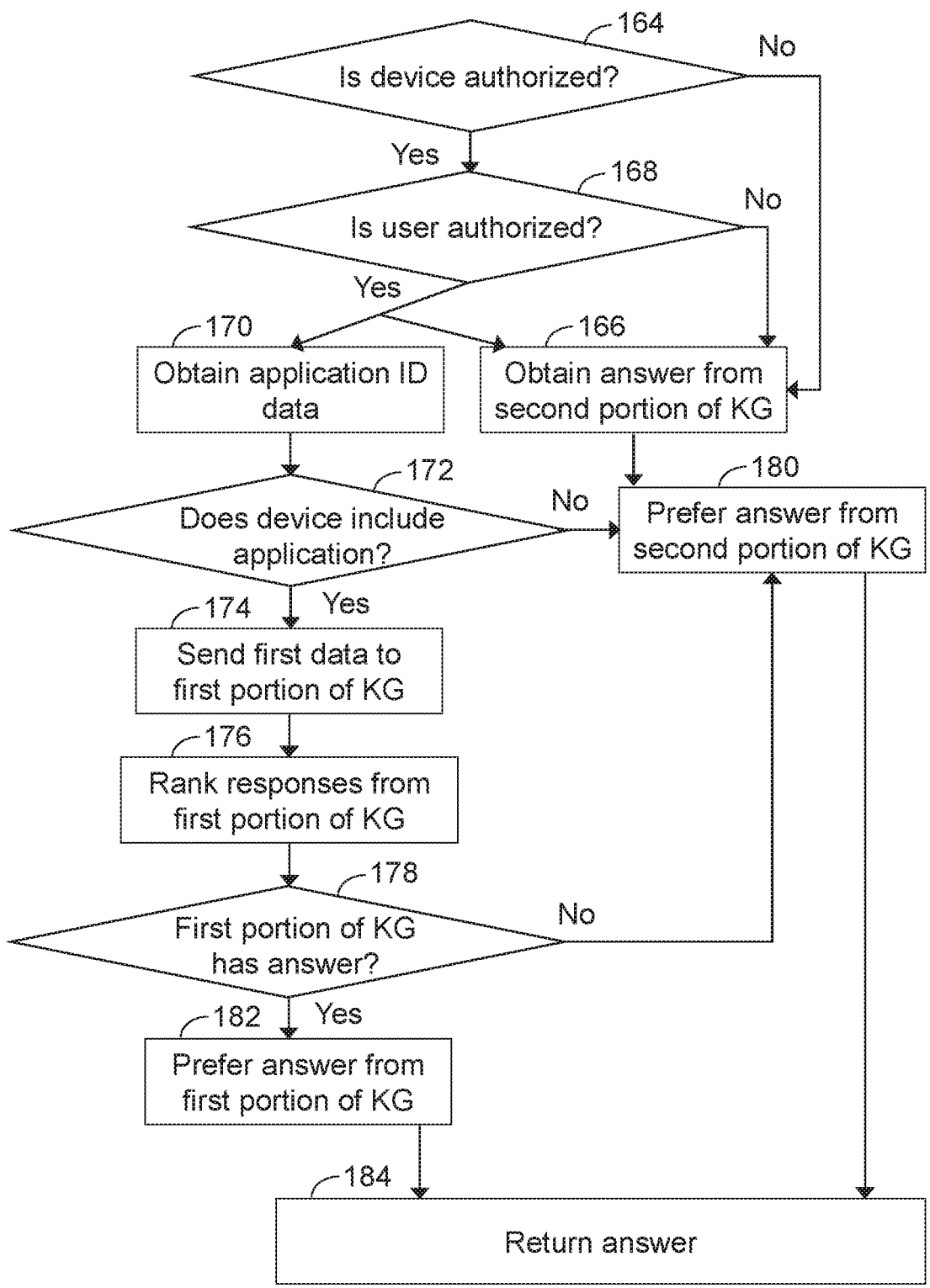
FIG. 4 is a flow diagram illustrating features of a method for obtaining an answer to a query according to yet further examples.

FIG. 4 is a flow diagram illustrating a method for obtaining an answer to a query according to further examples. Methods in accordance with FIG. 4 may be implemented using the system 118 of FIG. 2 or 5, for example. However, in other cases, methods in accordance with FIG. 4 may be implemented using other systems.

Figure 5:
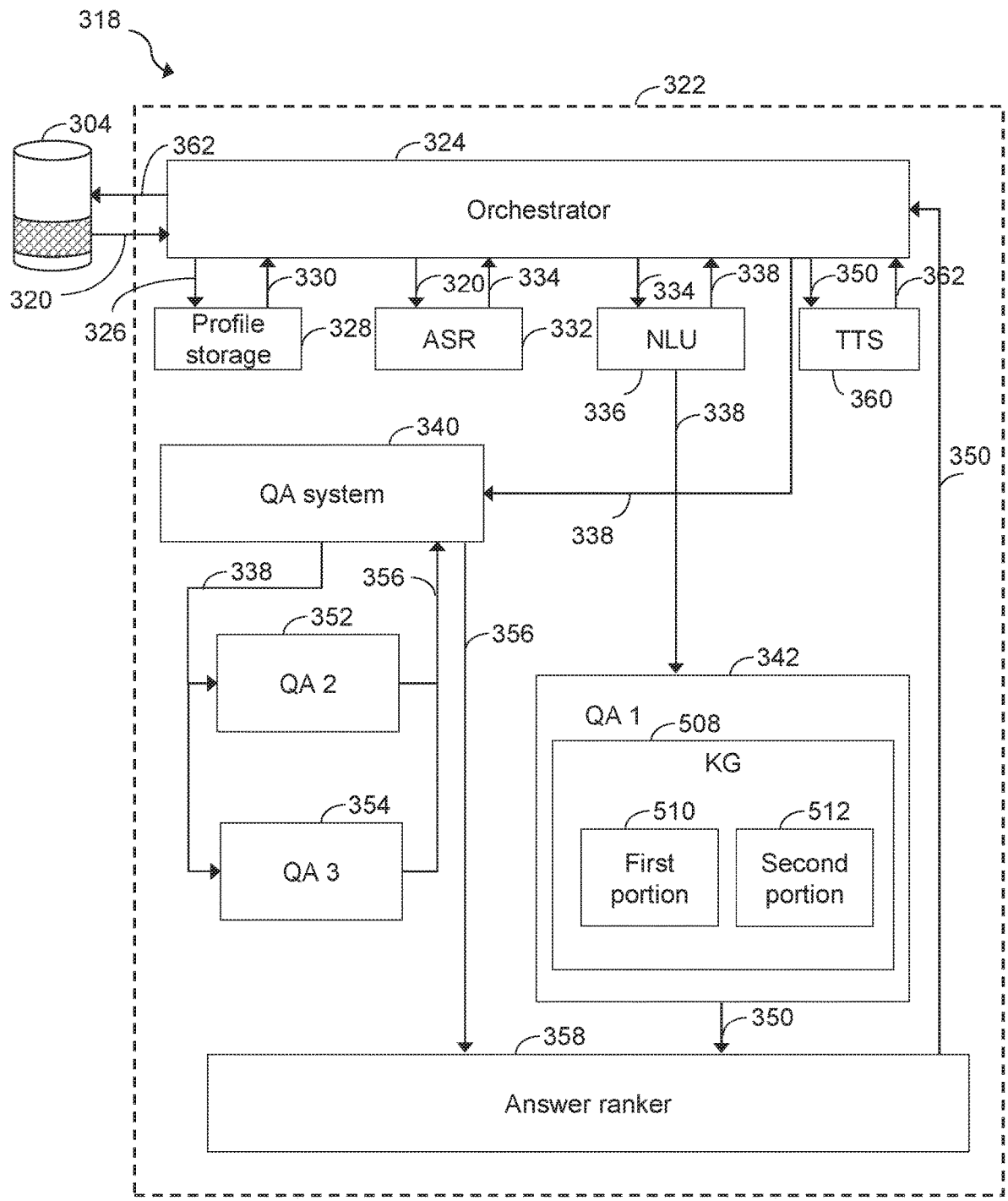
FIG. 5 illustrates schematically a further example of a system for use with methods described herein.

The method of FIG. 4 may be performed upon receipt of first data representative of a query received by an electronic device, such as the audio capture device 104 of FIGS. 1, 2 and 5. In other examples, the query may be received by a different electronic device than an audio capture device, such as a computer device. For example, an electronic device may be any electronic device, such as a laptop, personal computer, cellular telephone, personal digital assistant, or a so-called "smart" television (with processing or other computing capabilities).

The first data may be in any suitable format for representing a query. For example, the first data may be text data, which may be input in the form of text (e.g. by a text-based user interface) or may have been converted from a different format such as audio data. The method of FIG. 4 may for example be performed after NLU has been performed on data representative of the query, such as upon receipt of the first data or the text data by a query-answering system such as the first query-answering system 142 of FIG. 2, although this is merely an example.

The method of FIG. 4 involves, at item 164, determining whether the electronic device that received the query is authorized to access a first portion of the at least one KG, such as the first KG 144 of FIG. 2. This determination may be performed by a query-answering system, such as the first query-answering system 142 of FIG. 2, upon receipt of a query, or by a different component of a system such as the system 118 of FIG. 2. The determination of item 164 may use device ID data, such as the device ID data described with reference to FIG. 2. The device ID data is for example indicative of an identity of the electronic device that received the query.

If, at item 164, it is determined that the electronic device is not authorized to access the first portion of the at least one KG, the first data is sent to a second portion of the at least one KG, such as the second KG 146 of FIG. 2. An answer from the second portion of the at least one KG may then be obtained at item 166 of FIG. 4. The answer obtained from the second portion of the at least one KG may be referred to as a second answer to the query, which may be represented by third data.

Conversely, if it is determined at item 164 of FIG. 4 that the electronic device is authorized to access the first portion of the at least one KG, it is determined, at item 168, whether the user is authorized to access the first portion of the at least one KG. This for example uses user ID data indicative of an identity of a user of the electronic device, such as the user who posed the query. The user ID data may be similar to that described with reference to FIG. 2.

If it is determined, at item 168 of FIG. 4, that the electronic device is not authorized to access the first portion of the at least one KG, the first data is sent to the second portion of the at least one KG and an answer to the query is obtained from the second portion of the at least one KG at item 166 (for example by obtaining third data representative of a second answer to the query).

If the electronic device is determined, at item 168, to be authorized to access the first portion of the at least one KG, the first data is also sent to the second portion of the at least one KG, and an answer to the query is obtained from the second KG at item 166. However, in addition to sending the first data to the second portion of the at least one KG, the method of FIG. 4 also involves obtaining application identification (ID) data at item 170. The application ID data for example indicates at least one application that is operative on the electronic device. An application is for example computer-readable program instructions, such as software, that is configured to control a computer device to perform a particular function. In this case, the application is for example configured to provide or otherwise control access to the first knowledge graph. The application ID data may for example be a data structure, such as a list, table or database, that includes information regarding the applications that are available or are otherwise enabled on the electronic device. This information may be in the form of a list of application names or application ID numbers or other codes, that allow a determination to be made as to whether the electronic device includes a particular application.

The application ID data may be obtained in various different ways. For example, the application ID data may be sent to the query-answering system along with the query itself, for example as metadata associated with the query. This may be the case where the electronic device appends or otherwise includes the application ID data when sending the query to a system for answering the query, such as to the orchestrator component 124 of FIG. 2. In other examples, though, the application ID data may be retrieved from storage which may be external to the query-answering system. For example, there may be a storage system stored on a different server than a server used to host the query-answering system. The storage system may store information relating to electronic devices that may be used with the system, users associated with such electronic devices and applications operative on such electronic devices. The application ID data is an example of device characteristic data. It is to be appreciated that other types of device characteristic data may also be received along with the query to be answered or may be obtained subsequently, e.g from a further storage system.

Item 172 of FIG. 4 involves determining whether the electronic device includes an application that is associated with the first portion of the at least one KG. This may be determined using the application ID data. For example, if the application ID data represents a list of applications operative on the electronic device, the application ID codes associated with each of these applications may be compared against an application ID code associated with the application associated with the first portion of the at least one KG. If the electronic device includes an application with an application ID which matches that of the application associated with the first portion of the at least one KG, it may be determined that the electronic device includes the application associated with the first portion of the at least one KG.

If it is determined, at item 172 of FIG. 4, that the electronic device includes the application associated with the first portion of the at least one KG, the method of FIG. 4 involves, at item 174, sending the first data to the first portion of the at least one KG. Hence, if the query is obtained by an electronic device with this particular application, the first data representative of the query is submitted to both the first portion of the at least one KG and the second portion of the at least one KG (provided the electronic device and user are also authorized to access the first portion of the at least one KG).

The method of FIG. 4 involves receiving responses from the first portion of the at least one KG. For example, a first response may be received from the first KG. The responses are ranked at item 176 of FIG. 4. The ranking is for example in order of relevance to the query, for example to identify the most appropriate answer if the first portion of the at least one KG is able to provide a plurality of different answers. It is to be appreciated that item 176 may be omitted, for example in cases in which the first portion of the at least one KG provides a single response.

At item 178 of FIG. 4, it is determined whether the responses obtained from the first portion of the at least one KG include at least one answer. This may be determined for example where the first portion of the at least one KG returns second data representative of a first answer to the query. Such a determination may be made by comparing, for example, a first response from the first portion of the at least one KG against a default response indicating that the first portion of the at least one KG lacks an answer to the query. If so, the first response may be considered to lack an answer to the query. A determination such as this may be performed for each response received from the first portion of the at least one KG.

In some cases, a single response may be obtained from the first portion of the at least one KG, indicating that the first portion of the at least one KG is unable to answer the query. For example, a failure message may be received from the first portion of the at least one KG indicating that the first portion of the at least one KG lacks any answer to the query. Alternatively, though, the first portion of the at least one KG may not send an answer and/or a failure message, at all or within a predetermined time period. The predetermined time period may be set based on an intended response time for responding to the user with an answer to the query. In such cases, the lack of an answer (or other data) within the predetermined time period may itself be considered to be a response indicating that the first portion of the at least one KG lacks an answer to the query. If this is the case, the method of FIG. 4 involves, at item 180, preferring the answer obtained from the second portion of the at least one KG. If, however, the first portion of the at least one KG is determined to have an answer to the query at item 178 of FIG. 4, the answer from the first portion of the at least one KG is preferred, at item 182.

The preferred answer is returned at item 184. Returning the answer may involve returning the answer directly to the user, or converting the answer to a different format (e.g. from text to speech) before returning the answer to the user. For example, answer data representative of an answer to the query may be generated. For example, where the first portion of the at least one KG returns a first answer represented by second data, the answer data may be generated using the second data.

Hence, in examples such as that of FIG. 4, the method includes prioritizing the first answer (obtained from the first portion of the at least one KG) over the second answer (obtained from the second portion of the at least one KG) on the basis that the first answer is received from the first portion of the at least one KG. For example, the first answer and the second answer may be different from each other, but the first answer may nevertheless be prioritized, for example by preferring the first answer to the second answer, merely on the basis that the first answer is from the first portion of the at least one KG. For example, the answer data may be generated without ranking the first answer and the second answer in order of relevance of the query. The first answer may be returned more rapidly, with reduced use of computational resources, than if a ranking of the first and second answers is first performed.

However, it is to be appreciated that in further examples, the preferred answer (which is for example obtained from the first portion of the at least one KG where answers from both the first and second portions of the at least one KG are returned) may itself be ranked against answers obtained from other query-answering systems or subsystems. For example, the preferred answer may be returned to an answer ranking component such as the answer ranking component 158 of FIG. 2. If the preferred answer is determined, by the answer ranking component 158, to be the most appropriate answer, it may then be returned to the user.

In examples such as FIG. 4, the first data may be sent to the second portion of the at least one KG before a response (such as the first response) is received from the first portion of the at least one KG. For example, the first data may be sent asynchronously to the first and second portions of the at least one KG (in other words, at different points in time), or at the same time. However, methods such as FIG. 4 need not include waiting to receive a response from the first portion of the at least one KG before sending the first data to the second portion of the at least one KG. Indeed, in some cases, the first data may be sent to the second portion of the at least one KG before the first data is sent to the first portion of the at least one KG (although the converse may be the case in other examples). This may allow an answer to be obtained more rapidly than in cases in which the first data is sent to a subsequent KG after receipt of a response from a previous KG to which the first data has been previously sent.

FIG. 4 is merely an example, though. In other examples, at least one of item 164, item 168, and/or 172 of FIG. 3 may be omitted. This may be the case where the first dataset stored in the first portion of the at least one KG is generally available to any users who may be interested in it (albeit that the first dataset may be of interest to a smaller group of users than the second dataset of the second portion of the at least one KG). In such cases, a determination of whether to send the query to the first portion of the at least one KG may be based on device characteristic data representative of a different device characteristic, such as a device location or internet connection used by the device. Furthermore, in the example of FIG. 4, the second portion of the at least one KG returns an answer at item 166. However, in some cases, the second portion of the at least one KG may not include an answer. In such cases (and in other cases such as that of FIG. 4), the first portion of the at least one KG may return a first response, which example includes second data representative of a first answer to the query. However, rather than returning third data representative of a second answer to the query, the second portion of the at least one KG may merely return a second response indicating that second portion of the at least one KG lacks an answer to the query. In that case, the first answer from the first portion of the at least one KG will be returned if it is available (as the first answer from the first portion of the at least one KG takes priority over answers received from the second portion of the at least one KG in any case in the example of FIG. 4). If, however, the first portion of the at least one KG also lacks an answer to the query, the method of FIG. 4 may involve returning a default response indicating that both the first and second portions of the at least one KG are unable to answer the query.

The method of FIG. 4 may be similar, in at least some respects, to the method shown in FIG. 1. For example, the answer data generated on the basis of the second data representative of the first answer to the query (as received from the first portion of the at least one KG) may be first data returned to a first electronic device in response to a first query. However, the method of FIG. 4 may be performed numerous times using data received from various different electronic devices. For example, fourth data representative of a second query received by a second electronic device may be received and processed using the method of FIG. 4. Such processing may for example include receiving second device characteristic data indicative of at least one characteristic of the second electronic device. It may be determined to omit sending of the fourth data to the first portion of the at least one KG by determining, using the second device characteristic data, that the second electronic device lacks authorization to access the first portion of the at least one KG. This determination may be performed as described with reference to item 172 of FIG. 4. The fourth data may be sent to the second portion of the at least one KG and fifth data representative of a third answer to the second query may be received from the second portion of the at least one KG, for example as described with reference to item 166 of FIG. 4. In this case, the preferred answer may be the third answer. Hence, second answer data representative of the third answer may be generated using the fifth data. The second answer data, or further data derived from the second answer data, may then be returned to the user in response to the second query.

Hence, with methods such as this, the first answer to the first query may be different from the third answer to the second query, as the first answer is obtained from the first portion of the at least one KG whereas the third answer is obtained from the second portion of the at least one KG. This may be the case even where the first query is the same as the second query or where the first query is the same as a rephrased version of the second query.

As will be appreciated, in examples such as this, the first and second electronic devices may be a first and second audio capture device, respectively. The fourth data and the fifth data may be each be text data, respectively. Furthermore, text data may be processed using NLU to generate second NLU data, which may be sent to the second portion of the at least one KG instead of the text data itself. TTS processing and the text data representative of the answer to the query may be used to generate third audio data representative of the answer to the second query. The third audio data may be returned to the user rather than the text data (although in other cases, the text data may itself be returned to answer the query).

As described with reference to item 180 of FIG. 4, an answer received from the second portion of the at least one KG may be returned to the user (or selected as a preferred answer) in the event that the first portion of the at least one KG lacks an answer to a query. For example, the method of FIG. 4 may be used to return first answer data to a first query, where the first answer data is generated using the second data representative of the first answer to the query, which is obtained from the first portion of the at least one KG. However, the method of FIG. 4 may be performed subsequently upon receipt of sixth data representative of a third query received by the electronic device. In other words, two different queries (the first and third queries) may be received by the same electronic device. It may be determined, as for the first query, that the electronic device is authorized to access the first portion of the at least one KG. For example, this may be determined used the device characteristic data representative of a characteristic of the electronic device. The sixth data may be sent to the first and second portions of the at least one KG. A third response may be received from the first portion of the at least one KG and a fourth response may be received from the second portion of the at least one KG. It may be determined that the third response from the first portion of the at least one KG lacks an answer to the third query. It may also be determined that the fourth response from the second portion of the at least one KG includes seventh data representative of a fourth answer to the third query. Third answer data representative of the fourth answer to the third query may be generated using the seventh data. The fourth answer may then be returned to the user.

FIG. 5 shows schematically a further example of a system 318 that may be used to implement the methods described herein. Elements of FIG. 5 which are similar to corresponding elements of FIG. 2 are labelled using the same reference numerals incremented by 200.

The system 318 of FIG. 5 is the same as that of FIG. 2, except that the first query-answering system 342 includes a single KG 508, which includes a first portion 510 and a second portion 512. The first portion 510 is similar to the first KG 144 of FIG. 2, except that it forms part of the same KG 508 as the second portion 512. Similarly, the second portion 512 is similar to the second KG 146 of FIG. 2, except that it forms part of the same KG 508 as the first portion 510. The first portion 510 is for example less widely accessible than the second portion 512. The first portion 510 may be accessible to fewer user profiles and/or electronic devices than the second portion 512. The first and second portions 510, 512 may therefore be separate or distinct parts of the same KG 508, with different accessibility requirements. The first portion 510 may be a restricted access or otherwise access-controlled portion, for which access is controlled more strictly than the second portion 512. Conversely, the second portion 512 may be less restricted or otherwise non-access-controlled portion, which is more accessible than the first portion 510. The second portion 512 may include more general data and/or data that is less sensitive. The first portion 510 may, however, include more specific data and/or data that is private, personal, confidential or otherwise more sensitive than the second portion 512.

The first portion 510 may be stored in a first subset of nodes of the KG 508, such as in a first set of relational database tables. The second portion 512 may be stored in a second subset of nodes of the KG 508. The first portion 510 may include data that was previously stored in the second portion 512. For example, data from the second portion 512 may be indexed or otherwise included within the first portion 510 of the KG 508. The inclusion of data from the second portion 512 in the first portion 510 may be triggered by or otherwise in response to a particular access criterion being satisfied. For example, a user may be able to pay to include additional data in the first portion 510, where the first portion 510 for example represents a private portion of the KG 508.

In an example, data from the second portion 512 is indexed in the first portion 510 upon receipt of payment from a user (which may be effect via a graphical user interface (GUI) or other user interface). In this example, at least one relational database table of the second portion 512 (which for example includes non-access-controlled data) and the semantic constructs corresponding to the non-access-controlled data are added to a search space accessible to the first portion 510. In this way, this non-access-controlled data and the semantic constructs may be referenced when parsing or otherwise processing queries from devices and/or users that are permitted to access the first portion 510. In such cases, the first portion 510 and the second portion 512 are not directly connected. Instead, content from the second portion 512 is indexed in the first portion 510. However, in the context of examples described herein, data of the second portion 512 (including semantic constructs, which may be stored as relationship data) may nevertheless be considered to form part of or be otherwise included in the first portion 510. Hence, devices and/or users with access to the first portion 510 may then query the non-access-controlled data of the second portion 512 that is indexed in the first portion 510. However, such devices and/or users may not have access to other data of the second portion 512 that is not indexed in the first portion 510 by querying the first portion 510. In such cases, this other data may be accessed instead by directly querying the second portion 512. Conversely, devices and/or users which are not authorized to access the access-controlled data of the first portion 510 are prevent from accessing the access-controlled data, despite indexing of some of the content from the second portion 512 (which is accessible to such devices and/or users) in the first portion 510.

In other examples, data from the second portion 512 may be included in the first portion 510 in response to certain threshold access requirements being exceed. For example, if certain data from the second portion 512 is repeatedly used by the first portion 510 to answer queries (as described further with reference to FIG. 9), this data may be included in the first portion 510 of the KG 508 to improve the efficiency of asking similar queries in the future.

Figure 6:
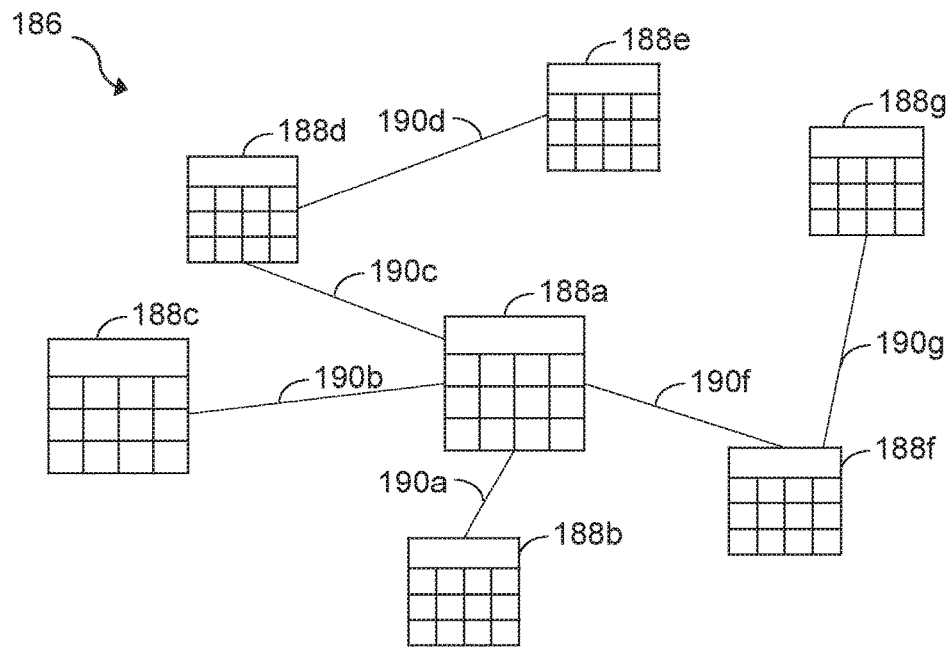
FIG. 6 illustrates schematically an example of a knowledge graph.

To put the examples of FIGS. 1 to 5 into context, an example of a KG 186 is shown schematically in FIG. 6. The first KG and the second KG (or a single KG including first and second portions) may have similar structures to that of the KG 186 of FIG. 6, although this is merely an example and other KG structures are possible. The KG 186 of FIG. 6 is shown in a simplified form for the purposes of illustration and it is to be appreciated that detail has been omitted from the KG 186 of FIG. 6 in the interests of clarity.

The KG 186 of FIG. 6 is in the form of a relational database including a plurality of tables 188a-188g. Two of the tables 188a, 188b are illustrated in more detail in FIG. 7. Each of the tables 188a-188g is connected or otherwise linked to another at least one of the tables 188a-188g via a relationship, which indicates a real-world or otherwise semantically meaningful relationship between elements of one of the tables 188a-188g and corresponding elements of another one of the tables 188a-188g. The relationships are labelled in FIG. 6 with the reference numerals 190a-190g.

Figure 7:
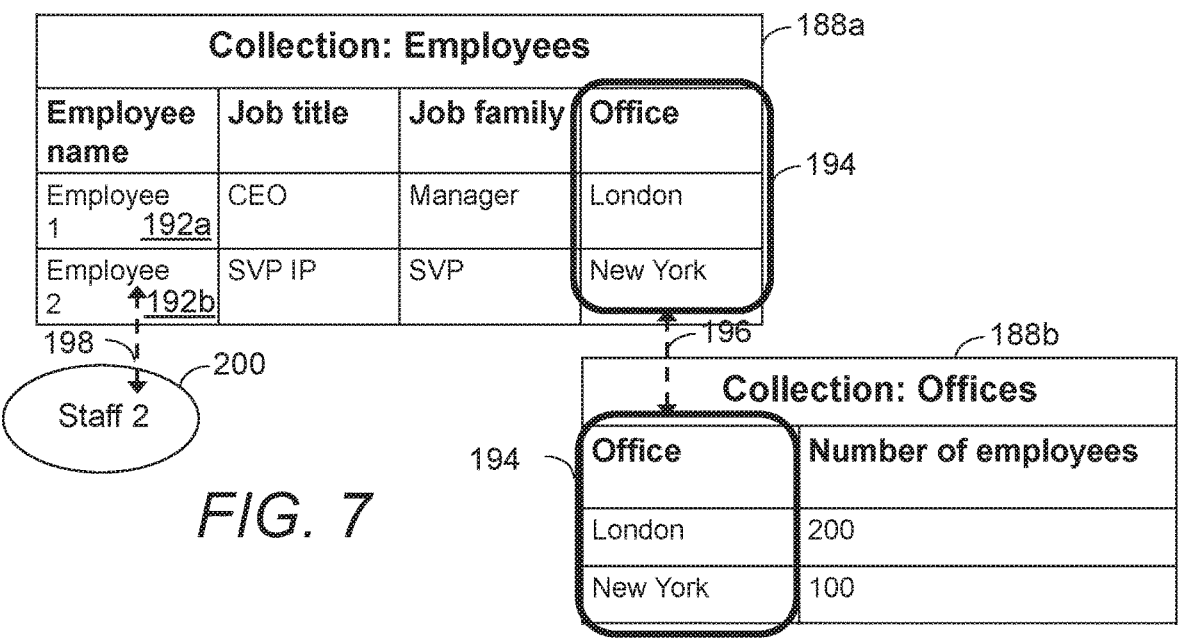
FIG. 7 illustrates schematically features of the knowledge graph of FIG. 6.

FIG. 7 illustrates schematically a first table 188a and a second table 188b. An entry in one of the tables 188a, 188b may be considered to correspond to an entity. An entity may be considered to correspond to a real-world object or concept such as a person or location. Such an object or concept may be abstract or may exist physically. In the example of FIG. 7, the first table 188a includes a first entity 192a (the person Employee 1) and a second entity 192b (the person Employee 2). The first and second entities 192a, 192b are both people, who are each employees, although this is merely an example. The first and second tables 188a, 188b also include other entities, which aren't specifically labelled in FIG. 7. For example, each cell of the first column of the first and second tables 188a, 188b for rows which do not correspond to title rows may be considered to correspond to a respective entity.

In FIGS. 6 and 7, each of the tables 188a-188g corresponds to a respective collection, which may be considered to correspond to a group of entities that share similar attributes. Hence, in FIG. 7, the first table 188a relates to the group of entities of employees. Hence, the first table 188a includes data relating to employees, for example of a particular organization. Each of the particular entities (in this case, each employee) is associated with various attributes. In the example of FIG. 7, each entity is associated with the attributes "job title", "job family" and "office". This is merely an illustrative example, though. In general, an attribute of an entity is a feature or other characteristic of a given entity. For example, an entity and an attribute of the entity may be expressed in the form of a fact triple (sometimes referred to simply as a "triple"). A fact triple generally corresponds to a particular subject-predicate-object expression, and may be expressed in the form of predicate (subject, object), where the predicate is a relationship or other relation and the subject and object may be considered to be entities that participate in that relationship. For example, with reference to FIG. 7, a fact triple may be expressed in the form of works in (employee, office). Hence, each employee may be considered to be an entity (in this example, a subject). However, each attribute may also be considered to be an entity (in this example, an object). On this basis, an attribute may itself be an entity of the KG 186.

In FIGS. 6 and 7, a relationship between an entity and its attributes may be implicit in the structure of a particular table 188a-188g. For example, in FIGS. 6 and 7, each of the attributes of a given entity are located in the same row of the table 188a-188g. This is merely an example though, and relationships between entities and attributes may be expressed in different ways in different KGs.

As can be seen in FIG. 7, some entities may be present in multiple different tables of the KG 186. In FIG. 7, the entities office 194 (in this case, the office locations London and New York) are present in both the first table 188a and the second table 188b. Whereas in the first table 188a, these entities 194 are attributes of the employee entities (in this case, Employee 1 192a and Employee 2 192b), in the second table 188b, these entities 194 have their own attributes (in this case, the number of employees). The same entities 194 may be linked or otherwise connected between different tables 188a-188g of the KG 186, as shown schematically via the link 196 in FIG. 7. Such a link may be used to represent a relationship between entities of the first table 188a and the second table 188b. For example, if a user were to ask a query such as "How many employees work in the same office as Employee 1?", this answer would be retrievable from the KG 186 via the link between the office attribute of the entity Employee 1 in the first table 188a and the office entity and the attribute number of employees in the same table 188b.

Each entity may have entity text associated with it. Entity text for example denotes or otherwise represents the entity associated with the entity text. This is shown in FIG. 7, in which the entity Employee 2 192b is associated 198 with the entity text 200. The entity text 200 for example corresponds with an alias of an entity, which is for example an alternative word or phrase that may be used to refer to the entity. By associating entity text (or aliases) with an entity, the rate of successful query-answering may be increased. For example, if a user were to query the KG 186 with a query referring to Staff 2 rather than Employee 2, the KG 186 may be able to determine that Staff 2 and Employee 2 are synonymous with each other, and that the query therefore refers to Employee 2. This may be determined for example using a string matching technique.

In the example of FIGS. 6 and 7, the KG 186 is in the form of a graph. Entities of the KG 186 (such as the employees Employee 1 192*a* and Employee 2 192*b*) and/or attributes of the KG 186 may be considered to correspond to nodes of a graph. Links and/or relationships between entities or attributes of the KG 186 may be considered to correspond to edges of the graph.

A KG such as the KG 186 of FIGS. 6 and 7 may be queried by first identifying entities and relations in a query. The entities and relations in a query may be identified using NLU for example. If a query includes two components of a fact triple, which may be expressed in the form of predicate (subject, object), the KG 186 can be queried to locate, for example, entities corresponding to the subject and the object, connected by a relationship corresponding to the predicate. The answer to the query can then be returned, for example by returning the missing component of the fact.

In other examples, answers may be obtained in other ways from a KG. For example, a KG may be queried using a template representative of a query and identifying portions of the KG that either exactly match the template or that match the template to a certain statistical degree. The template may be obtained from natural language (such as natural language representative of the query) using NLP techniques that would be familiar to the skilled person. A template representing a query may also be in the form of a graph. As explained above, a subject and/or object of a fact triple may correspond with a node of the graph and a predicate of a fact triple may correspond with an edge of the graph. In such cases, a template graph representing the query may include a first node corresponding with a subject, a second node corresponding with an object and an edge connecting the first node to the second node, which represents the predicate. An answer to such a query may be retrieved from the KG by determining a portion of the graph representing the KG (for example including two nodes and an edge connecting the two nodes) that corresponds with or otherwise matches the template graph, either exactly or to a certain level of statistical certainty.

Figure 8:
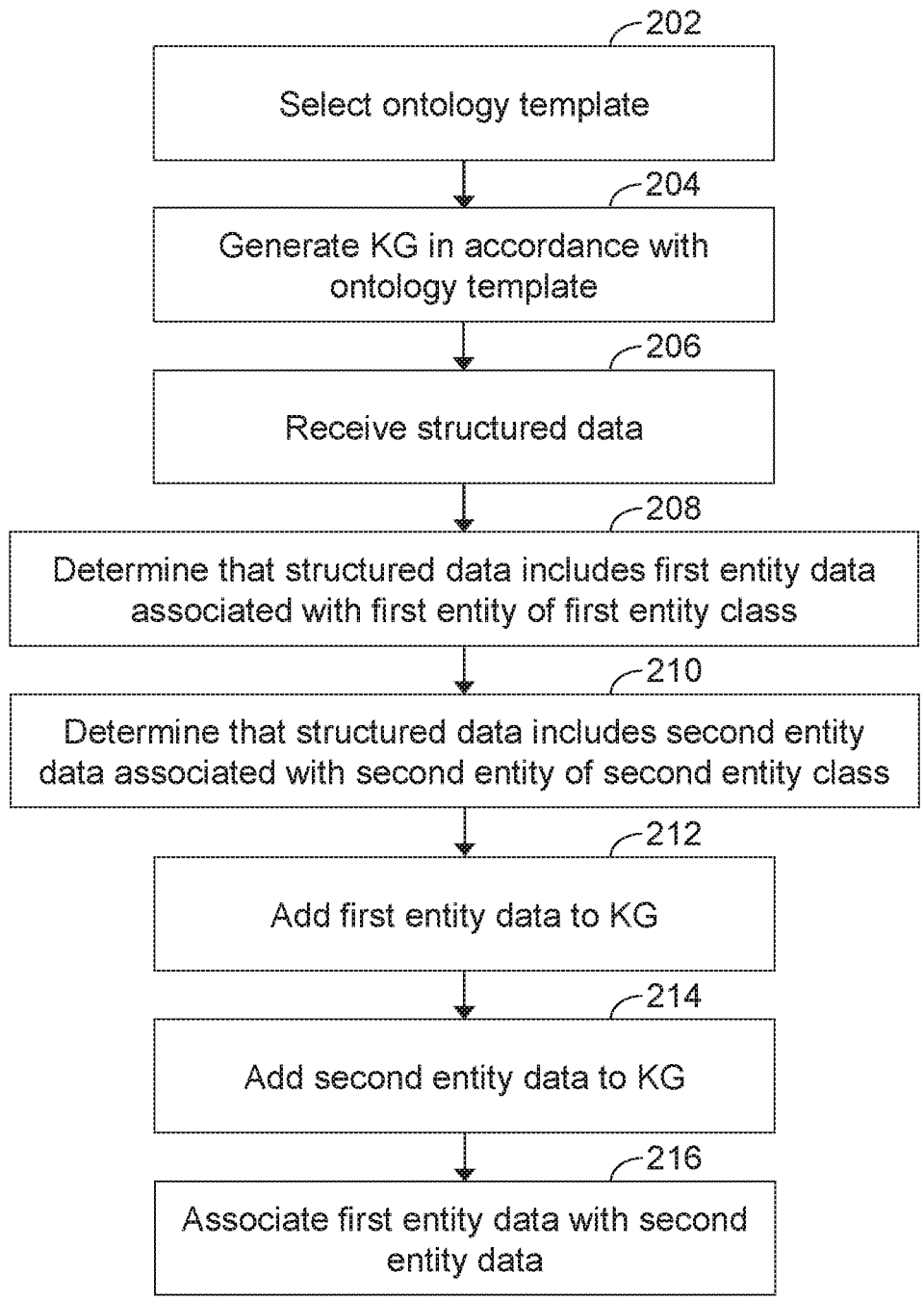
FIG. 8 is a flow diagram illustrating generation of a knowledge graph according to examples.

Further methods relate to setting up or otherwise generating a KG such as the KG 186 of FIGS. 6 and 7. FIG. 8 is a flow diagram illustrating an example of such methods.

At item 202 of FIG. 8, an ontology template is selected. For example, a plurality of different ontology templates may be presented or otherwise available to a user, and the user may be able to select a particular ontology template that resembles or is most closely related to data to be input to the KG to be generated. An ontology for examples formally defines a relationship between concepts, data or other entities in a way that is semantically or otherwise logically meaningful. For example, an ontology may be considered to be a hierarchical arrangement of real-world concepts. As an example, a plurality of pre-defined ontology templates available to a user may include a people directory (e.g. for storing data relating to people, such as employees), or property facts (e.g. for storing data related to properties and/or locations). The ontology template may therefore represent a pre-defined relationship between a first entity class and a second entity class. For example, such a pre-defined relationship may be the relationship works in between the first entity class employees and the second entity class offices. An entity class for example corresponds to a group of entities with a feature or other characteristic in common. For example, entities of the first entity class employees may each be employed by an entity.

At item 204 of FIG. 8, a KG (which may be used as the first KG, or a first portion of at least one KG, described with reference to FIGS. 1 to 5) is generated in accordance with the ontology template selected at item 202. For example, as the ontology template may define relationships and entity classes, the KG may be generated with nodes corresponding to respective entity classes and edges corresponding to respective relationships.

At item 206 of FIG. 8, structured data is received. Structured data is for example any data which is stored according to a particular data model. For example, structured data may be organized in a pre-defined manner or otherwise according to a pre-defined schema. The structure of the structured data may be used to infer relationships between entities of the structured data. As an example, structured data may be in the form of comma-separated value (CSV) data. CSV data may be in the form of text data, with a comma character used to separate values. For example, a CSV file may be used to store tables of data in text, which may be more efficient than other data formats.

At item 208 of FIG. 8, it is determined that the structured data includes first entity data associated with a first entity of the first entity class of the KG generated at item 204. This may for example be performed by parsing the structured data to identify entity classes. For example, where the structured data represents a table (in CSV format or otherwise), a column heading may be considered to correspond to an entity class. Then, it may be determined that the structured data includes data related to the first entity class by comparing column headings of the structured data with the first entity class (or entity text denoting the first entity class), e.g. using a string matching technique. If a column heading of the structured data matches the first entity class of the KG, it may be determined that the structured data includes the first entity data. It is to be noted, though, that other methods may be used to perform such a determination, which may be more complex. Furthermore, in some cases, a user may be able to modify or otherwise alter a mapping between fields of structured data and a corresponding entity class of the KG.

At item 210 of FIG. 8, it is determined that the structured data includes second entity data associated with a second entity of the second entity class of the KG generated at item 204. This may be performed similarly to item 208 of FIG. 8, but searching for a different entity class than item 208.

The first entity data is added to the KG at item 212, and the second entity data is added to the KG at item 214. This may include adding an additional entry to the KG, for example if the KG generated at item 204 does not include an empty data record or other entry (which for example corresponds with a node of the KG) for the first entity data and the second entity data to be added to the KG.

At item 216 of FIG. 8, the first entity data is associated with the second entity data, within the KG, to indicate that the first entity is related to the second entity by the pre-defined relationship. This may involve adding a new edge to the KG, and/or updating an edge to represent the relationship between the first entity and the second entity.

Using methods in accordance with FIG. 8, the KG may be generated in a simple and rapid manner. For example, a user need not create their own ontology template, which may be time consuming and require detailed technical knowledge. Furthermore, the user need not themselves associate data with respective nodes and edges of the KG. Instead, the method may appropriately populate the KG with the data to be added to the KG. By structuring the data in the form of the KG, the data can be easily queried, for example using NLP techniques, to obtain answers to queries. Such answers may be much more easily obtainable from the first KG than from a potentially complex series of datasets.

Similarly, methods similar to FIG. 8 may be used to import new data to the KG in a straightforward way. For example, item 204 may be omitted if the KG has already been generated. In such cases, the new data may simply be added to the KG in accordance with the ontology template, provided the new data includes entity data relating to entities of entity classes that are present in the ontology template.

Methods described herein may use data of the second KG (or the second portion of the at least one KG) (which is for example accessible to a larger group of users than the first KG or the first portion of the at least one KG) to update or otherwise supplement the first KG (or the first portion of the at least one KG). This therefore obviates the need to include a large amount of data in the first portion of the at least one KG, and allows the first portion of the at least one KG to benefit from developments or other improvements to the second portion of the at least one KG. FIGS. 9 to 12 show respective flow diagrams of various examples of such methods.

Figure 9:
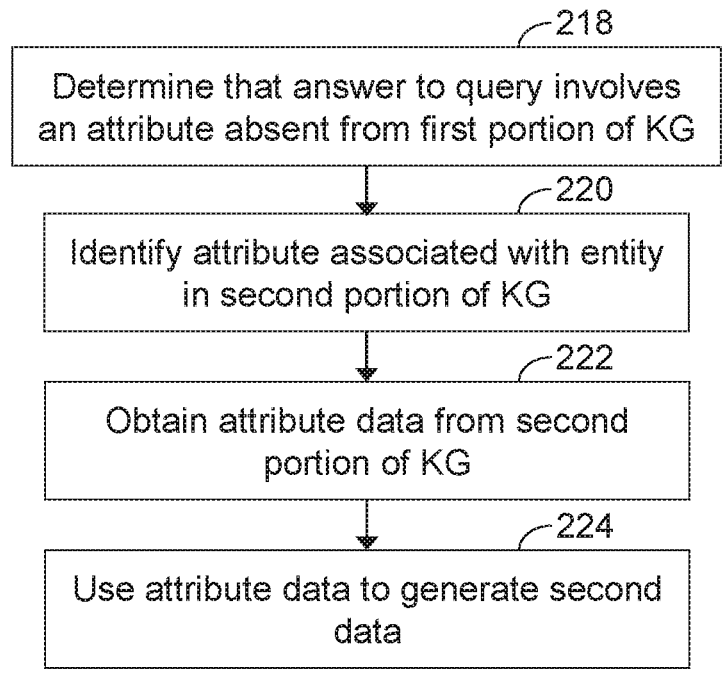
FIG. 9 is a flow diagram illustrating a method of use of data of a second portion of at least one knowledge graph to obtain an answer from a first portion of the at least one knowledge graph according to examples.
Figure 10:
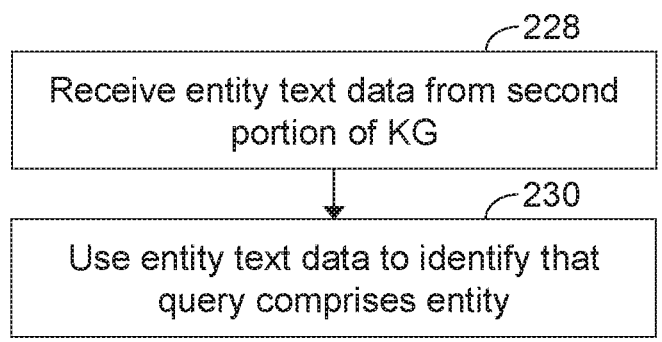
FIG. 10 is a flow diagram illustrating a method of use of data of a second portion of at least one knowledge graph to obtain an answer from a first portion of the at least one knowledge graph according to further examples.

FIG. 9 relates to an example in which the second portion of the at least one KG may be used to answer a query that the first portion of the at least one KG may otherwise be unable to answer. Item 218 of FIG. 9 includes determining that an answer to the query involves an attribute which is absent from the first portion of the at least one KG. This may for example involve performing NLU on data representative of the query (such as the first data or the NLU data described above), to identify entities in the query. The first KG may then be queried to determine whether the first portion of the at least one KG includes the entities of the query. The attributes of the entity may then be identified, whereupon it may be determined whether the first portion of the at least one KG includes the appropriate attribute.

At item 220, the second portion of the at least one KG is used to identify the attribute associated with the entity. In examples in which the first and second portions of the at least one KG are first and second KGs, respectively, this may involve sending entity data representative of the entity of the query for which the attribute is absent from the first KG to the second KG. This may for example be sent to the second KG along with an attribute class indicative of the type of attribute to be retrieved. At item 222, attribute data representative of the attribute is obtained from the second portion of the at least one KG. This may for example involve sending the attribute data from the second KG to the first KG. At item 224, the attribute data is used to generate the second data.

For example, the query may relate to the weather at a particular location. Whereas the location may correspond to an entity within the first portion of the at least one KG, the weather may be absent from the second portion of the at least one KG. In this case, the second portion of the at least one KG may be used to determine the weather at the location (where the weather is for example an attribute of the location). The weather at the location may be returned in answer to the query, using data from both the first portion of the at least one KG and the second portion of the at least one KG. This may be beneficial where, for example, the first portion of the at least one KG is a relatively complex query, which relies on relationships that may be present within the FIG. 10 relates to an example in which the second portion of the at least one KG is used to supplement aliases of the first portion of the at least one KG. This for example increases the number of name variations that the first portion of the at least one KG is able to recognize relate to the same entity. At item 228 of FIG. 10, entity text data is received from the second portion of the at least one KG. The entity text data for example represents entity text associated with an entity of the query. At item 230 of FIG. 10, the entity text data is used to identify that the query comprises the entity. As explained above, the entity text for example denotes a particular entity may be considered to correspond to an alias of the entity. The method of FIG. 10 may be performed periodically, as aliases of the second portion of the at least one KG may be updated periodically. Alternatively, the method of FIG. 10 may be performed in response to an update of the second portion of the at least one KG, and/or when a user of the first portion of the at least one KG requests an update to the first portion of the at least one KG.

Figure 11:
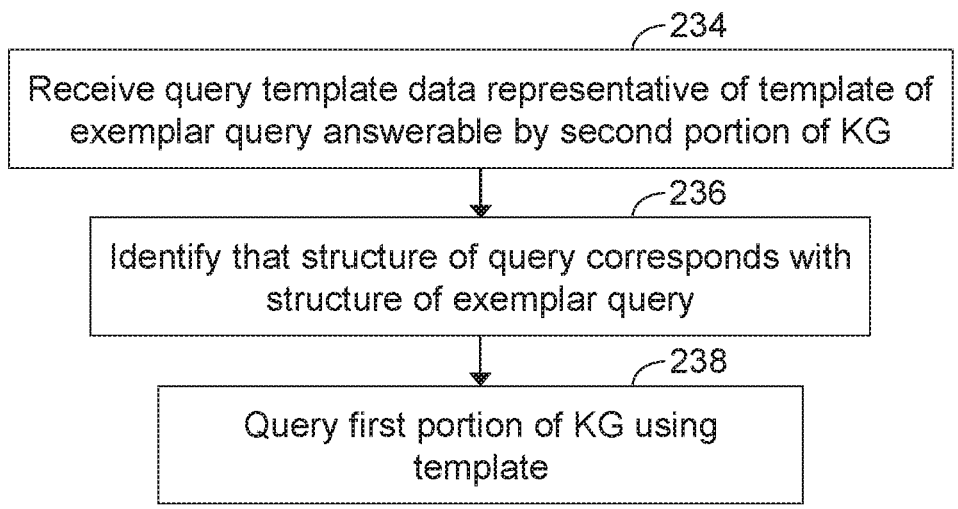
FIG. 11 is a flow diagram illustrating a method of use of data of a second portion of at least one knowledge graph to obtain an answer from a first portion of the at least one knowledge graph according to yet further examples.

FIG. 11 relates to an example in which query templates associated with the second portion of the at least one KG are used to supplement query templates associated with the first portion of the at least one KG. In this way, the first portion of the at least one KG may be able to successfully answer a wider range of questions than otherwise. At item 234 of FIG. 11, query template data representative of a template of an exemplar query answerable by the second portion of the at least one KG is received, for example by the first portion of the at least one KG or by the application associated with the first portion of the at least one KG. This template may then be used subsequently to query the first portion of the at least one KG, for example to obtain answers to queries with a similar structure to that of the exemplar query.

Hence, at item 236 of FIG. 11, it is identified that a structure of the query corresponds with a structure of the exemplar query. The first portion of the at least one KG is queried, at item 238, using the template of the exemplar query. In this way, the second data (representative of the answer to the query) may be obtained using the template obtained from the second portion of the at least one KG.

Figure 12:
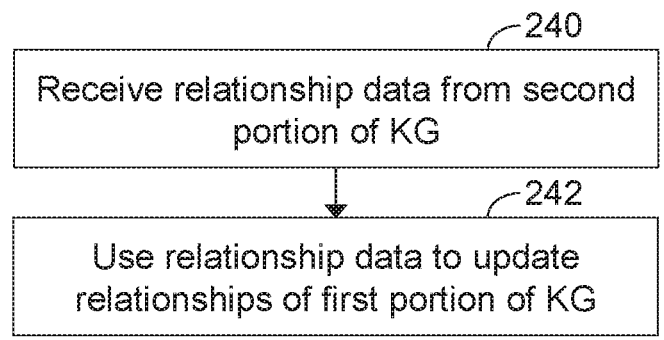
FIG. 12 is a flow diagram illustrating a method of use of data of a second portion of at least one knowledge graph to update a first portion of the at least one knowledge graph according to examples.

FIG. 12 relates to an example in which relationships between entities within the first portion of the at least one KG are updated based on relationships within the second portion of the at least one KG. Item 240 of FIG. 12 involves receiving relationship data from the second portion of the at least one KG. The relationship data is indicative of a relationship between a first entity of the first portion of the at least one KG and a second entity of the first portion of the at least one KG. In other words, the second portion of the at least one KG may involve the same entities as the first portion of the at least one KG (as well as additional entities that are absent from the second portion of the at least one KG). At item 242 of FIG. 12, the first entity is associated with the second entity within the first portion of the at least one KG via the relationship received from the second portion of the at least one KG. In this way, the first portion of the at least one KG may be updated appropriately, in a simple manner. This further enhances the ability of the first portion of the at least one KG to accurately answer queries. As for the example in FIG. 10, the examples of FIG. 11 and FIG. 12 may be performed at any time, such as every so often (or at regular or irregular intervals), upon updates to the second portion of the at least one KG, when requested by a user, and/or at other times.

As will be appreciated, the systems described herein are merely illustrative; the methods described herein may be performed using a number of different devices and computer systems, including, for example, general-purpose computing systems, server-client computing systems, mainframe computing systems, telephone computing systems, laptop computers, cellular phones, personal digital assistants (PDAs), tablet computers, far field devices such as the Amazon Echo, automobile computer systems, robots or other mobile devices such as wearable devices like smart watches.

For example, the methods described herein may be performed using a system including at least one processor and at least one memory comprising computer program instructions. The at least one processor and the at least one memory may be located in the same computer device, or the at least one processor and the at least one memory may be located in different devices, such as in a distributed computer system, such as a cloud computer system.

The at least one processor may be a central processing unit (CPU) for processing data and computer-readable instructions. In other examples, the at least one processor may be a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computer devices, e.g., a combination of a DSP and a microprocessor, a plurality of microprocessors, one or more microprocessors in conjunction with a DSP core, or any other such configuration. The at least one processor may be coupled, using one or more buses, to read information from or write information to one or more memories, such as the at least one memory. The at least one processor may additionally, or in the alternative, contain memory, such as processor registers.

The at least one memory may include volatile random access memory (RAM), non-volatile read only memory (ROM), and/or other types of memory. In other examples, the at least one memory may be a data storage component of a computer device, for storing data and instructions. The data storage component may include one or more storage types such as magnetic storage, optical storage or solid-state storage. Computer instructions for processing by the at least one processor for operating the computer device and its various components in accordance with the methods described herein may be executed by the at least one processor and stored in the at least one memory. Some or all of the executable instructions may be embedded in hardware or firmware in addition to or instead of software. The methods described herein may be implemented in various combinations of software, firmware, and/or hardware, for example.

Figure 13:
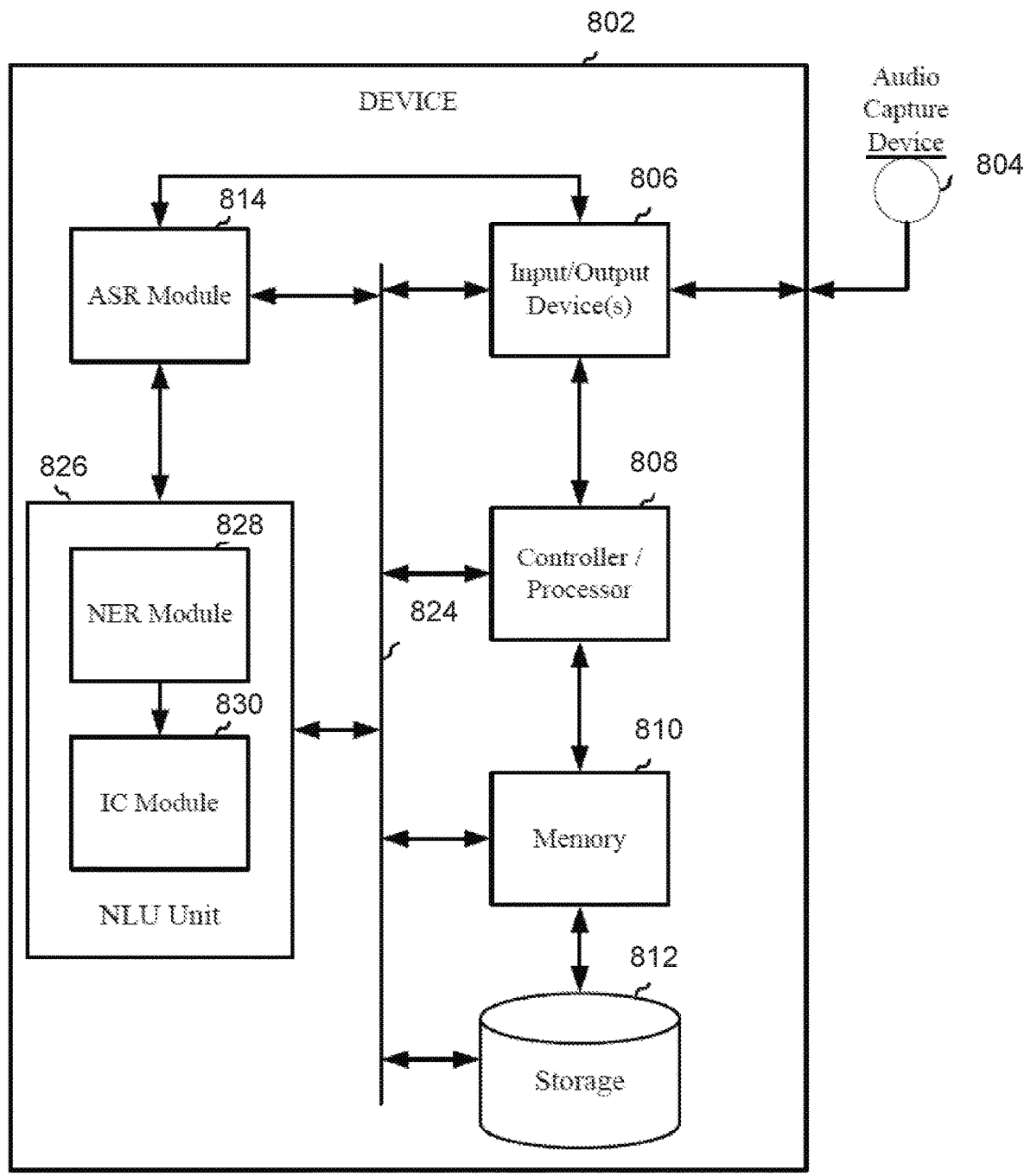
FIG. 13 is a block diagram illustrating schematically a device for use with examples described herein.

FIG. 13 illustrates schematically an example of an electronic device 802 for use with examples described herein. In examples herein, computer-readable and computer-executable instructions may reside on the electronic device 802. FIG. 13 illustrates a number of components that may be included in the electronic device 802, however other non-illustrated components may also be included. Also, some of the illustrated components may not be present in every electronic device capable of employing aspects described herein. Further, some components that are illustrated in the electronic device 802 of FIG. 13 as a single component may also appear multiple times in a single electronic device. For example, the electronic device 802 may include multiple input/output devices 806 or multiple processors The electronic device 802 of FIG. 13 includes a processor 808, which may be referred to as a controller. The processor 808 may be a central processing unit (CPU) for processing data and computer-readable instructions. The electronic device 802 also includes a memory 810 for storing data and instructions. The memory 810 may include volatile random access memory (RAM), non-volatile read only memory (ROM), and/or other types of memory. The electronic device 802 may also include a data storage component 812, for storing data and instructions. The data storage component 812 may include one or more storage types such as magnetic storage, optical storage, solid-state storage, etc. The electronic device 802 may also be connected to removable or external memory and/or storage (such as a removable memory card, memory key drive, and/or networked storage) through the input/output device 806. Computer instructions for processing by the processor 808 for operating the electronic device 802 and its various components in accordance with the examples described herein may be executed by the processor 808 and stored in the memory 810, storage 812, external device, and/or in memory or other storage included in the ASR module 814 discussed below. Alternatively, some or all of the executable instructions may be embedded in hardware or firmware in addition to or instead of software.

A variety of input/output device(s) 806 may be included in the electronic device 802. Example input devices include an audio capture device 804, such as a microphone, a touch input device, keyboard, mouse, stylus or other input device. In the example of FIG. 13, the audio capture device 804 is illustrated as a separate component. However, as noted with reference to FIG. 2, in other examples, the audio capture device 804 may form part of or be otherwise integral to the electronic device 802. Example output devices include a visual display, tactile display, audio speakers, headphones, printer or other output device. The input/output device 806 may also include an interface for an external peripheral device connection such as universal serial bus (USB), Fire-Wire, Thunderbolt or other connection protocol. The input/output device 806 may also include a network connection such as an Ethernet port, modem, etc. The input/output device 806 may also include a wireless communication device, such as radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, etc. Through the input/output device 806 the electronic device 802 may connect to a network, such as the Internet or private network, which may include a distributed computing environment.

In the example of FIG. 13, the electronic device 802 also includes an ASR module 814. The ASR module 814 may be similar to the ASR systems 132, 332 of FIGS. 2 and 5. The ASR module 814 may be connected to the bus 824, input/output device(s) 806, audio capture device 804, processor 808, NLU unit 826 and/or other component of the electronic device 802. Audio data sent to the ASR module 814 may come from the audio capture device 804 or may be received by the input/output device 806, such as audio data captured by a remote entity and sent to the electronic device 802 over a network.

Following ASR processing, the ASR results may be sent by the ASR module 814 to another component of the electronic device 802, such as the processor 808 for further processing (such as execution of a command included in the interpreted text) or to the input/output device 806 for sending to an external device. ASR results may be sent to a natural language understanding (NLU) unit 826 for further speech processing. The NLU unit 826 may be similar to the NLU systems 136, 136 of FIGS. 2 and 5, and may include a dedicated NLU engine, processor, memory, storage, named entity recognition (NER) module 828, intent classification (IC) module 830, and/or other components, and/or may use components otherwise available on the electronic device 802.

Data may be transferred between components of the electronic device 802 via the bus 824.

Further examples are envisaged, which include combinations of features of the originally filed claims, as indicated in the following table, which lists various envisaged claim dependencies for the claims originally filed with this application. Hence, in addition to the description above, this table gives basis in the specification for general examples having a combination of features of claims filed herewith:

| Claim as Originally Filed | Envisaged Claim Dependencies |
| --- | --- |
| 1 | — |
| 2 | 1 |
| 3 | 1,2 |
| 4 | — |
| 5 | 4 |
| 6 | 4,5 |
| 7 | Any one of claims 4 to 6 |
| 8 | Any one of claims 4 to 7 |
| 9 | Any one of claims 4 to 8 |
| 10 | Any one of claims 4 to 9 |
| 11 | Any one of claims 4 to 10 |
| 12 | Any one of claims 4 to 11 |
| 13 | Any one of claims 4 to 12 |
| 14 | Any one of claims 4 to 13 |
| 15 | Any one of claims 4 to 14 |
| 16 | Any one of claims 4 to 15 |
| 17 | Any one of claims 4 to 16 |
| 18 | — |
| 19 | 18 |
| 20 | 19 |

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method comprising:
receiving first data representative of a first query received by a first electronic device;
receiving first device characteristic data indicative of at least one characteristic of the first electronic device;
determining, using the first device characteristic data, that the first electronic device is authorized to access a first portion of at least one knowledge graph, wherein the first portion of the at least one knowledge graph is an access-controlled portion and the at least one knowledge graph comprises a second portion which is a non-access-controlled portion;
sending the first data to at least the first portion of the at least one knowledge graph;
receiving second data from the first portion of the at least one knowledge graph, wherein the second data is representative of an answer to the first query;
generating first answer data representative of the answer to the first query, using the second data;
receiving third data representative of a second query received by a second electronic device;
receiving second device characteristic data indicative of at least one characteristic of the second electronic device;
determining, using the second device characteristic data, that the second electronic device lacks authorization to access the first portion of the at least one knowledge graph;
sending the third data to the second portion of the at least one knowledge graph;
receiving fourth data from the second portion of the at least one knowledge graph, the fourth data representative of an answer to the second query; and
generating second answer data representative of the answer to the second query, using the fourth data.

2. The method according to claim 1, wherein the answer to the first query is a first answer to the first query, and the method comprises:
receiving fifth data representative of a second answer to the first query, different from the first answer to the first query, from the second portion of the at least one knowledge graph; and
prioritizing the first answer to the first query over the second answer to the first query on the basis that the first answer to the first query is received from the first portion of the at least one knowledge graph.

3. The method according to claim 1, wherein the first device characteristic data comprises at least one of: device identification data indicative of an identity of the first electronic device, user profile data indicative of a user profile associated with the first electronic device, organization identification data indicative of an organization associated with the first electronic device, context data indicative of a context in which the first query was received, device configuration data indicative of at least one configuration aspect of the first electronic device, or application identification data indicative of at least one application operative on the first electronic device.

4. The method according to claim 1, wherein the first electronic device is an audio capture device, the first data is first audio data representative of a spoken utterance captured by the audio capture device, the device characteristic data comprises user profile data indicative of a user profile associated with the audio capture device, and the method comprises:
generating the first device characteristic data by processing the first audio data using voice recognition to identify the user profile associated with the audio capture device;
generating confidence data representative of a confidence with which the user profile associated with the audio capture device is identified; and
determining to send the first data to at least the first portion of the at least one knowledge graph using the confidence data.

5. The method according to claim 1, wherein the first at least one portion of the at least one knowledge graph is a first knowledge graph associated with a first plurality of user profiles and the second at least one portion of the at least one knowledge graph is a second knowledge graph associated with a second plurality of user profiles comprising the first plurality of user profiles and at least one further user profile.

6. The method according to claim 1, comprising:
receiving sixth data representative of a third query received by the first electronic device;
sending the sixth data to the at least one knowledge graph;
determining that the first portion of the at least one knowledge graph lacks an answer to the third query;
receiving seventh data from the second portion of the at least one knowledge graph, wherein the seventh data is representative of a fourth answer to the third query;

generating third answer data representative of the fourth answer to the third query, using the seventh data.

7. The method according to claim 1, wherein the first portion of the at least one knowledge graph is a first knowledge graph, the second portion of the at least one knowledge graph is a second knowledge graph, and the method comprises sending the first data to the second knowledge graph before the receiving the second data from the first knowledge graph.

8. The method according to claim 1, wherein the first portion of the at least one knowledge graph is a first knowledge graph, the second portion of the at least one knowledge graph is a second knowledge graph, and the first knowledge graph is authorized to access the second knowledge graph but the second knowledge graph is prevented from accessing the first knowledge graph.

9. The method according to claim 1, comprising:
determining that the answer to the first query involves an attribute which is absent from the first portion of the at least one knowledge graph;
identifying, using the second portion of the at least one knowledge graph, the attribute associated with an entity for which the attribute is to be obtained;
obtaining, from the second portion of the at least one knowledge graph, attribute data representative of the attribute; and
using the attribute data to generate the second data.

10. The method according to claim 1, comprising:
receiving entity text data from the second portion of the at least one knowledge graph, the entity text data representative of entity text associated with an entity of the first query;
using the entity text data to identify that the first query comprises the entity.

11. The method according to claim 1, comprising:
receiving query template data representative of a template of an exemplar query answerable by the first portion of the at least one knowledge graph and the second portion of the at least one knowledge graph;
identifying that a structure of the first query corresponds with a structure of the exemplar query; and
querying the first portion of the at least one knowledge graph using the template of the exemplar query to generate the second data.

12. The method according to claim 1, comprising:
receiving relationship data from the second portion of the at least one knowledge graph, the relationship data indicative of a relationship between a first entity of the first portion of the at least one knowledge graph and a second entity of the first portion of the at least one knowledge graph; and
associating, within the first portion of the at least one knowledge graph, the first entity with the second entity via the relationship.

13. The method according to claim 1, comprising:
generating the first portion of the at least one knowledge graph in accordance with an ontology template representative of a pre-defined relationship between a first entity class and a second entity class;
receiving structured data;
determining that the structured data comprises:
first entity data associated with a first entity of the first entity class; and
second entity data associated with a second entity of the second entity class;
adding the first entity data to the first portion of the at least one knowledge graph;
adding the second entity data to the first portion of the at least one knowledge graph; and
associating the first entity data with the second entity data, within the first portion of the at least one knowledge graph, to indicate that the first entity is related to the second entity by the pre-defined relationship.

14. A system comprising:
at least one processor;
at least one memory comprising computer program instructions,
the at least one memory and the computer program instructions operable to, with the at least one processor:
receive first data representative of a query received by an electronic device;
receive device characteristic data indicative of at least one characteristic of the electronic device;
determine, using the device characteristic data, that the electronic device is authorized to access a first portion of at least one knowledge graph, wherein the first portion of the at least one knowledge graph is an access-controlled portion and the at least one knowledge graph comprises a second portion which is a non-access-controlled portion;
send the first data to at least the first portion of the at least one knowledge graph;
receive second data from the first portion of the at least one knowledge graph, wherein the second data is representative of a first answer to the query;
receive third data representative of a second answer to the query, different from the first answer to the query, from the second portion of the at least one knowledge graph;
prioritize the first answer to the query over the second answer to the query on the basis that the first answer to the query is received from the first portion of the at least one knowledge graph; and
generate answer data representative of the first answer to the query, using the second data.

15. The system according to claim 14, wherein the first portion of the at least one knowledge graph is a first knowledge graph, the second portion of the at least one knowledge graph is a second knowledge graph, and the system comprises an access control component operable to provide a one-way connection between the first knowledge graph and the second knowledge graph such that the first knowledge graph has at least read access to the second knowledge graph without the second knowledge graph having read access to the first knowledge graph.

16. The system according to claim 14, wherein the at least one memory and the computer program instructions are operable to, with the at least one processor:
determine that an answer to the query involves an attribute which is absent from the first portion of the at least one knowledge graph;
identify, using the second portion of the at least one knowledge graph, the attribute associated with an entity for which the attribute is to be obtained;
obtain, from the second portion of the at least one knowledge graph, attribute data representative of the attribute; and
use the attribute data to generate the second data.

17. A method comprising:
receiving first data representative of a query received by an electronic device;
receiving device characteristic data indicative of at least one characteristic of the electronic device;

determining, using the device characteristic data, that the electronic device is authorized to access a first portion of at least one knowledge graph, wherein the first portion of the at least one knowledge graph is an access-controlled portion and the at least one knowledge graph comprises a second portion which is a non-access-controlled portion;

sending the first data to the first portion of the at least one knowledge graph;

receiving second data from the first portion of the at least one knowledge graph, wherein the second data is representative of a first answer to the query;

sending the first data to the second portion of the at least one knowledge graph;

receiving third data representative of a second answer to the query, different from the first answer to the query, from the second portion of the at least one knowledge graph;

prioritizing the first answer to the query over the second answer to the query on the basis that the first answer to the query is received from the first portion of the at least one knowledge graph; and generating answer data representative of the first answer to the query, using the second data.

18. The method according to claim 17, wherein the query is a first query and the answer data is first answer data, and the method comprises:

receiving fourth data representative of a second query received by the electronic device;

sending the fourth data to the at least one knowledge graph;

determining that the first portion of the at least one knowledge graph lacks an answer to the second query;

receiving fifth data from the second portion of the at least one knowledge graph, wherein the fifth data is representative of an answer to the second query;

generating second answer data representative of the answer to the second query, using the fifth data.

19. The method according to claim 17, comprising:

determining that the first answer to the query involves an attribute which is absent from the first portion of the at least one knowledge graph;

identifying, using the second portion of the at least one knowledge graph, the attribute associated with an entity for which the attribute is to be obtained;

obtaining, from the second portion of the at least one knowledge graph, attribute data representative of the attribute; and using the attribute data to generate the second data.

20. The method according to claim 17, generating the first portion of the at least one knowledge graph in accordance with an ontology template representative of a pre-defined relationship between a first entity class and a second entity class;

receiving structured data;

determining that the structured data comprises:
  first entity data associated with a first entity of the first entity class; and
  second entity data associated with a second entity of the second entity class;
  adding the first entity data to the first portion of the at least one knowledge graph;
  adding the second entity data to the first portion of the at least one knowledge graph; and
  associating the first entity data with the second entity data, within the first portion of the at least one knowledge graph, to indicate that the first entity is related to the second entity by the pre-defined relationship.

* * * * *